United States Patent
Yang et al.

(10) Patent No.: US 11,929,812 B2
(45) Date of Patent: Mar. 12, 2024

(54) TECHNIQUES FOR REDUCING FEEDBACK INFORMATION

(71) Applicant: QUALCOMM Incorporated, San Diego, CA (US)

(72) Inventors: Lin Yang, San Diego, CA (US); Bin Tian, San Diego, CA (US); Jialing Li Chen, San Diego, CA (US); Sameer Vermani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 69 days.

(21) Appl. No.: 16/579,471

(22) Filed: Sep. 23, 2019

(65) Prior Publication Data

US 2020/0153491 A1    May 14, 2020

Related U.S. Application Data

(60) Provisional application No. 62/758,544, filed on Nov. 10, 2018.

(51) Int. Cl.
*H04B 7/06*    (2006.01)
*H04B 7/0417*  (2017.01)
*H04L 25/02*   (2006.01)

(52) U.S. Cl.
CPC .......... *H04B 7/066* (2013.01); *H04B 7/0417* (2013.01); *H04L 25/0204* (2013.01); *H04L 25/0228* (2013.01)

(58) Field of Classification Search
CPC ... H04B 7/066; H04B 7/0417; H04L 25/0204; H04L 25/0228

USPC ........................................................ 375/267
See application file for complete search history.

(56) References Cited

U.S. PATENT DOCUMENTS

| | | | | |
|---|---|---|---|---|
| 9,232,429 | B2* | 1/2016 | Zhang | H04B 7/0617 |
| 2005/0286404 | A1* | 12/2005 | Poon | H04L 1/0026 |
| | | | | 370/208 |
| 2006/0291544 | A1* | 12/2006 | Fischer | H04W 80/00 |
| | | | | 375/267 |
| 2016/0359532 | A1* | 12/2016 | Cao | H04B 7/066 |

\* cited by examiner

*Primary Examiner* — Wednel Cadeau
(74) *Attorney, Agent, or Firm* — Holland & Hart LLP

(57) ABSTRACT

This disclosure provides systems, devices, apparatus, and methods, including computer programs encoded on storage media, for techniques for reducing feedback information in an extremely high throughput (EHT) wireless local area network (WLAN). A receiving device (beamformee), such as a station (STA), may receive a sounding signal from a transmitting device (beamformer), such as an access point (AP), and transmit channel feedback. The receiving device may transmit the channel feedback as part of a reduced compressed beamforming feedback (CBF) operation that includes determining a first set of channel characteristics. The receiving device may select a subset of the first set of channel characteristics and determine a set of differential characteristics based on the subset. The transmitting device may then transmit the sets of characteristics as reduced CBF to the transmitting device. The transmitting device may determine a channel estimation for beamformed signaling based on the reduced CBF.

29 Claims, 19 Drawing Sheets

TECHNIQUES FOR REDUCING FEEDBACK INFORMATION

CROSS REFERENCE

The present application for patent claims the benefit of U.S. Provisional Patent Application No. 62/758,544 by YANG et al., entitled "TECHNIQUES FOR REDUCING FEEDBACK INFORMATION," filed Nov. 10, 2018, assigned to the assignee hereof, and which is expressly incorporated by reference in its entirety herein.

TECHNICAL FIELD

This disclosure relates generally to wireless communications, and more specifically, to techniques for reducing feedback information.

DESCRIPTION OF THE RELATED TECHNOLOGY

Some APs and STAs support beamforming. Beamforming is the signal processing technique that includes focusing the energy of a transmission in the direction of a target receiver. Beamforming may be used in a single-user context, for example, to improve a signal-to-noise ratio (SNR). Beamforming may also be used in a multi-user context, for example, to enable multi-user multiple-input multiple-output (MU-MIMO) transmissions. To perform beamforming, a transmitter, referred to as the beamformer, transmits multiple signals, each signal from one antenna element of an antenna array. The beamformer configures the phase shifts between the signals that are transmitted from the different antenna elements so that the signals add constructively in a particular direction that is towards the intended receivers, which are referred to as beamformees. The manner in which the beamformer configures the phase shifts may depend on channel state information associated with the wireless channels over which the beamformer intends to communicate with the beamformees. To obtain the channel state information, the beamformer may perform a channel sounding procedure with the beamformees. For example, the beamformer may transmit one or more sounding signals to the beamformees. The beamformees may then perform measurements of the channel based on the sounding signals and subsequently provide feedback to the beamformer based on the measurements, for example, in the form of a feedback matrix. The beamformer may then generate a steering matrix for each of the beamformees based on the feedback and use the steering matrix to configure the phase shifts for subsequent transmissions to the beamformees.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. In some implementations, the method includes receiving, by a beamformee (for example, a station (STA)), a sounding signal from an associated beamformer (for example, an access point (AP)) over an operating bandwidth. The sounding signal may be received over one or more spatial streams using multiple antennas (for example, as part of an antenna array). The STA may then determine a set of channel characteristics of the operating bandwidth for feedback in response to the sounding signal. In some examples, in order to reduce feedback overhead, the STA may reduce the set of channel characteristics. The STA may transmit the reduced set of channel characteristics to the AP, for example, in a compressed beamforming feedback (CBF) form. The AP may process the reduced set of channel characteristics for determining an effective channel for subsequent data transmission, for example, as part of a multiple-input multiple-output (MIMO) transmission over the operating bandwidth.

Another innovative aspect of the subject matter described in the disclosure can be implemented in one or more additional methods for wireless communication. In some implementations, the described methods include determining one or more feedback reduction parameters for reducing the set of channel characteristics. The one or more feedback reduction parameters may include a reduction value corresponding to a numerical quantity of antennas or spatial streams for determining the average channel. The one or more feedback reduction parameters may also include an averaging bandwidth. The one or more feedback reduction parameters may be indicated by the STA as part of a MIMO control field or configured by the AP as part of a null data packet (NDP) announcement (NDPA) frame used to transmit the sounding signal. Based on the one or more feedback reduction parameters, the STA may determine a subset of the set of channel characteristics, such as a subset of an average channel.

A method of wireless communication at a STA is described. The method may include receiving, from an AP, a sounding signal including one or more spatial streams transmitted over an operating bandwidth, determining a first set of channel characteristics of the operating bandwidth based on receiving the sounding signal, determining a second set of channel characteristics of the operating bandwidth by reducing a numerical quantity of the first set of channel characteristics based on a feedback reduction parameter, and transmitting, to the AP, the second set of channel characteristics.

An apparatus for wireless communication at a STA is described. The apparatus may include a processor, memory in electronic communication with the processor, and instructions stored in the memory. The instructions may be executable by the processor to cause the apparatus to receive, from an AP, a sounding signal including one or more spatial streams transmitted over an operating bandwidth, determine a first set of channel characteristics of the operating bandwidth based on receiving the sounding signal, determine a second set of channel characteristics of the operating bandwidth by reducing a numerical quantity of the first set of channel characteristics based on a feedback reduction parameter, and transmit, to the AP, the second set of channel characteristics.

Another apparatus for wireless communication at a STA is described. The apparatus may include means for receiving, from an AP, a sounding signal including one or more spatial streams transmitted over an operating bandwidth, determining a first set of channel characteristics of the operating bandwidth based on receiving the sounding signal, determining a second set of channel characteristics of the operating bandwidth by reducing a numerical quantity of the first set of channel characteristics based on a feedback reduction parameter, and transmitting, to the AP, the second set of channel characteristics.

A non-transitory computer-readable medium storing code for wireless communication at a STA is described. The code may include instructions executable by a processor to receive, from an AP, a sounding signal including one or more spatial streams transmitted over an operating bandwidth, determine a first set of channel characteristics of the operating bandwidth based on receiving the sounding signal, determine a second set of channel characteristics of the operating bandwidth by reducing a numerical quantity of the first set of channel characteristics based on a feedback reduction parameter, and transmit, to the AP, the second set of channel characteristics.

In some examples of the method, apparatuses, and non-transitory computer-readable medium described herein, transmitting the second set of channel characteristics further may include operations, features, means, or instructions for transmitting a multiple input multiple output (MIMO) control field formatted to include one or more indications of the feedback reduction parameter associated with the second set of channel characteristics.

Some examples of the method, apparatuses, and non-transitory computer-readable medium described herein may further include operations, features, means, or instructions for configuring the MIMO control field to include at least one bit for indicating that a reduced compressed beamforming feedback operation may be associated with the second set of channel characteristics, the at least one bit including one or more reserved bits of the MIMO control field.

Some examples of the method, apparatuses, and non-transitory computer-readable medium described herein may further include operations, features, means, or instructions for configuring one or more index subfields of the MIMO control field to indicate a reduction value for associated with the second set of channel characteristics, or an averaging bandwidth associated with the second set of channel characteristics, or both. In some examples, the feedback reduction parameter may include the reduction value, the averaging bandwidth, or both.

Some examples of the method, apparatuses, and non-transitory computer-readable medium described herein may further include operations, features, means, or instructions for extending one or more subfields of the MIMO control field, the one or more subfields indicating a capability for support for a reduced compressed beamforming feedback operation over the operating bandwidth. In some examples, the feedback reduction parameter may include information indicating the capability for support for a reduced compressed beamforming feedback operation over the operating bandwidth.

In some examples of the method, apparatuses, and non-transitory computer-readable medium described herein, determining the first set of channel characteristics further may include operations, features, means, or instructions for determining an average channel of the operating bandwidth.

Some examples of the method, apparatuses, and non-transitory computer-readable medium described herein may further include operations, features, means, or instructions for selecting a subset of the first set of channel characteristics based on the feedback reduction parameter. In some examples, the second set of channel characteristics includes the subset, and determining a set of differential characteristics based on the subset of the first set of channel characteristics. In some examples, the set of differential characteristics is associated with the average channel of the operating bandwidth.

Some examples of the method, apparatuses, and non-transitory computer-readable medium described herein may further include operations, features, means, or instructions for determining a numerical quantity of feedback bits associated with the set of differential characteristics. In some examples, the number of feedback bits may be based on one or more of: a numerical quantity of generated angles for the set of differential characteristics, selected codebook information, an averaging bandwidth for sending the set of differential characteristics, a numerical quantity of bits for signal-to-noise ratio feedback, and a numerical quantity of bits for relative signal-to-noise ratio feedback based on the averaging bandwidth.

Some examples of the method, apparatuses, and non-transitory computer-readable medium described herein may further include operations, features, means, or instructions for configuring a compressed beamforming report field to include the subset and the set of differential characteristics. In some examples, transmitting the second set of channel characteristics includes transmitting an action frame containing the subset and the set of differential characteristics as feedback in the compressed beamforming report field.

Some examples of the method, apparatuses, and non-transitory computer-readable medium described herein may further include operations, features, means, or instructions for determining the average channel over an extended bandwidth that exceeds the averaging bandwidth. In some examples, the determining may be associated with the set of differential characteristics.

In some examples of the method, apparatuses, and non-transitory computer-readable medium described herein, a performance loss, a component of a transmit correlation matrix, an operating bandwidth, or an averaging bandwidth of the operating bandwidth.

In some examples of the method, apparatuses, and non-transitory computer-readable medium described herein, the averaging bandwidth includes a reduced portion of the operating bandwidth.

Some examples of the method, apparatuses, and non-transitory computer-readable medium described herein may further include operations, features, means, or instructions for determining a numerical quantity of feedback bits associated with the second set of channel characteristics. In some examples, the number of feedback bits may be based on one or more of: a numerical quantity of generated angles for the second set of channel characteristics, selected codebook information, an averaging bandwidth for sending the second set of channel characteristics, a numerical quantity of bits for signal-to-noise ratio feedback, and a numerical quantity of bits for relative signal-to-noise ratio feedback based on the averaging bandwidth.

In some examples of the method, apparatuses, and non-transitory computer-readable medium described herein, the second set of channel characteristics may be determined as part of a single user sounding procedure or as part of a multi-user sounding procedure.

Some examples of the method, apparatuses, and non-transitory computer-readable medium described herein may further include operations, features, means, or instructions for transmitting a capability bit to indicate support at the STA for reduced compressed beamforming feedback. In some examples, receiving the sounding signal may be based on transmitting the capability bit.

In some examples of the method, apparatuses, and non-transitory computer-readable medium described herein, the second set of channel characteristics includes compressed beamforming feedback information.

In some examples of the method, apparatuses, and non-transitory computer-readable medium described herein, the operating bandwidth includes a first bandwidth of at least 320 MHz or a second bandwidth including a first 160 MHz portion and a second non-adjacent 160 MHz portion.

In some examples of the method, apparatuses, and non-transitory computer-readable medium described herein, the STA supports multi-antenna operations over a set of spatial streams.

A method of wireless communication at an AP is described. The method may include determining a feedback reduction parameter for a channel sounding procedure, transmitting, to a STA, a sounding signal including one or more spatial streams transmitted over an operating bandwidth, and receiving a set of channel characteristics from the STA based on transmitting the sounding signal, the set of channel characteristics having a reduced numerical quantity based on the feedback reduction parameter.

An apparatus for wireless communication at an AP is described. The apparatus may include a processor, memory in electronic communication with the processor, and instructions stored in the memory. The instructions may be executable by the processor to cause the apparatus to determine a feedback reduction parameter for a channel sounding procedure, transmit, to a STA, a sounding signal including one or more spatial streams transmitted over an operating bandwidth, and receive a set of channel characteristics from the STA based on transmitting the sounding signal, the set of channel characteristics having a reduced numerical quantity based on the feedback reduction parameter.

Another apparatus for wireless communication at an AP is described. The apparatus may include means for determining a feedback reduction parameter for a channel sounding procedure, transmitting, to a STA, a sounding signal including one or more spatial streams transmitted over an operating bandwidth, and receiving a set of channel characteristics from the STA based on transmitting the sounding signal, the set of channel characteristics having a reduced numerical quantity based on the feedback reduction parameter.

A non-transitory computer-readable medium storing code for wireless communication at an AP is described. The code may include instructions executable by a processor to determine a feedback reduction parameter for a channel sounding procedure, transmit, to a STA, a sounding signal including one or more spatial streams transmitted over an operating bandwidth, and receive a set of channel characteristics from the STA based on transmitting the sounding signal, the set of channel characteristics having a reduced numerical quantity based on the feedback reduction parameter.

Some examples of the method, apparatuses, and non-transitory computer-readable medium described herein may further include operations, features, means, or instructions for receiving a set of differential characteristics from the STA. In some examples, the set of differential characteristics are received with the set of channel characteristics, determining a channel on one or more subcarriers of the operating bandwidth based on the set of channel characteristics and the set of differential characteristics, and transmitting a beamformed signal over the channel to the STA based on the determining.

Some examples of the method, apparatuses, and non-transitory computer-readable medium described herein may further include operations, features, means, or instructions for transmitting a frame including one or more indications of the feedback reduction parameter associated with the set of channel characteristics.

Some examples of the method, apparatuses, and non-transitory computer-readable medium described herein may further include operations, features, means, or instructions for configuring at least one bit in a field of the frame to indicate a reduced compressed beamforming feedback operation.

Some examples of the method, apparatuses, and non-transitory computer-readable medium described herein, the field may be a common information field.

In some examples of the method, apparatuses, and non-transitory computer-readable medium described herein, the common information field may be included as part of an extended STA info field of the frame.

Some examples of the method, apparatuses, and non-transitory computer-readable medium described herein may further include operations, features, means, or instructions for configuring one or more index subfields of the frame to indicate a reduction value associated with the second set of channel characteristics, or an averaging bandwidth associated with the set of channel characteristics, or both.

In some examples of the method, apparatuses, and non-transitory computer-readable medium described herein, the frame includes a null data packet announcement frame.

In some examples of the method, apparatuses, and non-transitory computer-readable medium described herein, the set of channel characteristics may be received as part of a single user sounding procedure or as part of a multi-user sounding procedure.

In some examples of the method, apparatuses, and non-transitory computer-readable medium described herein, a performance loss, a component of a transmit correlation matrix, the operating bandwidth, or an averaging bandwidth of the operating bandwidth.

In some examples of the method, apparatuses, and non-transitory computer-readable medium described herein, the averaging bandwidth includes a reduced portion of the operating bandwidth.

Some examples of the method, apparatuses, and non-transitory computer-readable medium described herein may further include operations, features, means, or instructions for transmitting a capability bit to indicate support at the AP for reduced compressed beamforming feedback. In some examples, transmitting the sounding signal may be based on transmitting the capability bit.

In some examples of the method, apparatuses, and non-transitory computer-readable medium described herein, the set of channel characteristics includes compressed beamforming feedback information.

In some examples of the method, apparatuses, and non-transitory computer-readable medium described herein, the operating bandwidth includes a first bandwidth of at least 320 MHz or a second bandwidth including a first 160 MHz portion and a second non-adjacent 160 MHz portion.

In some examples of the method, apparatuses, and non-transitory computer-readable medium described herein, the AP supports multi-antenna operations over a set of spatial streams.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

DETAILED DESCRIPTION

Figure 1:
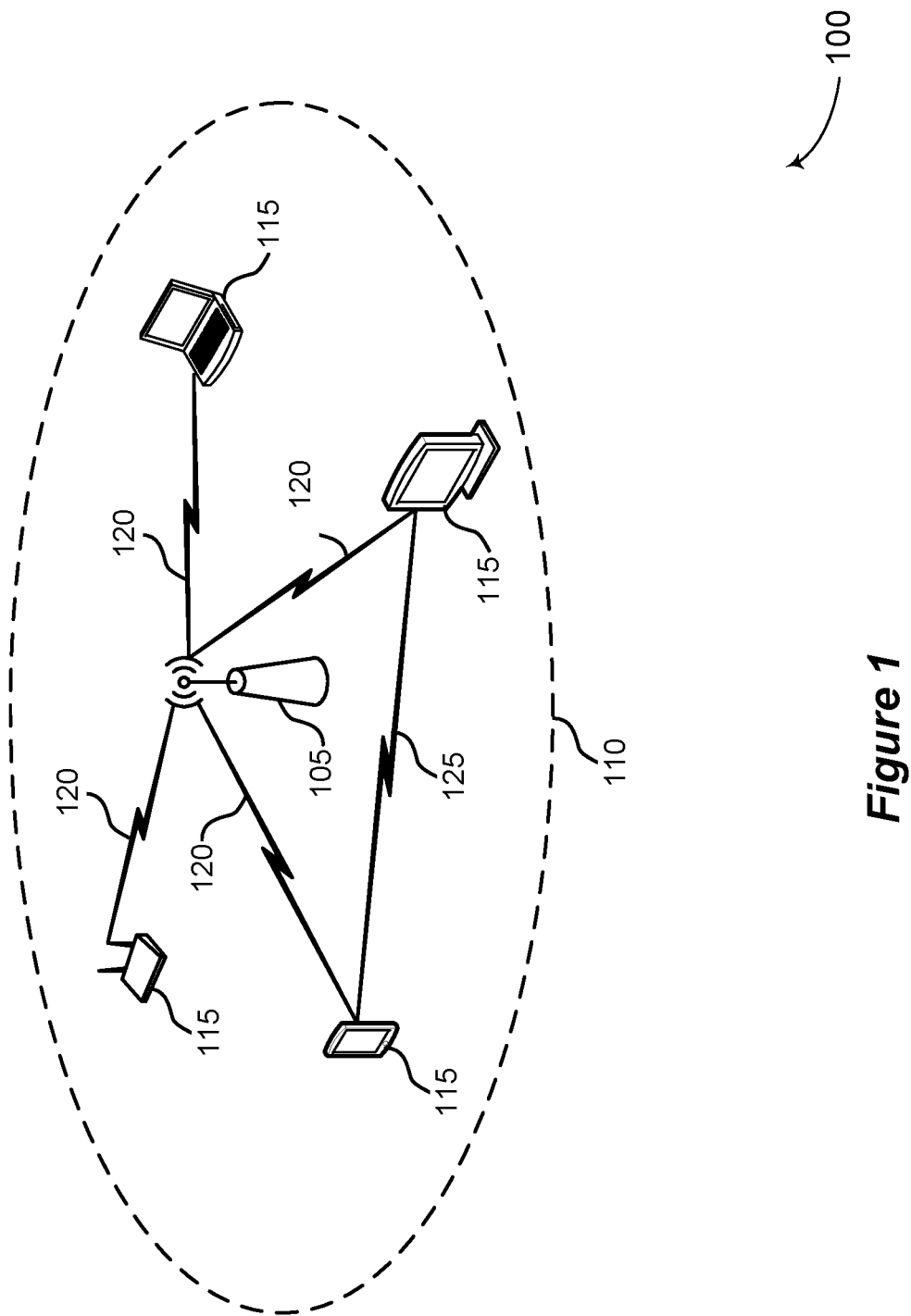
FIG. 1 illustrates an example of a wireless communication network that supports techniques for reducing feedback information in accordance with aspects of the present disclosure.

The following description is directed to implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G standards, among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal frequency division multiple access (OFDMA), single-user multiple-input multiple-output (SU-MIMO) and multi-user MIMO (MU-MIMO). The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to techniques for reducing feedback information in a WLAN, such as a next generation Wi-Fi network, which also may be referred to as an extremely high throughput (EHT) network. Some implementations more specifically relate to reducing feedback information provided as part of a channel sounding procedure for SU-MIMO or MU-MIMO communications. In some examples, reducing the feedback information may include reducing a set of channel characteristics. Some implementations more specifically relate to a beamformee (for example, a station (STA)) reducing signaling payloads for reduced compressed beamforming feedback (CBF) based on one or more feedback reduction parameters. The one or more feedback reduction parameters may include a reduction value corresponding to a numerical quantity of antennas or spatial streams for determining an average channel, or an averaging bandwidth. At least one of the STA or an access point (AP) may configure the one or more feedback reduction parameters.

In some implementations, the STA may receive a sounding signal from the AP via one or more spatial streams. The STA may determine a set of channel characteristics based on the received sounding signal. To reduce signaling overhead associated with transmitting CBF to the AP, the STA may initiate a reduction operation for the set of channel characteristics. For example, the STA may calculate an average channel of the operating bandwidth and determine a subset of a calculated average channel. Based on the reduction operation, the STA may determine the set of differential characteristics (for example, differential measurements) associated with the calculated average channel. In some examples, the STA may reduce the set of channel characteristics according to the one or more feedback reduction parameters. In some examples, the reduced set of channel characteristics may include the set of differential characteristics.

The STA may configure one or more fields, including a MIMO control field or a CBF report field associated with an action frame (for example a Compressed Beamforming and Channel Quality Indicator (CQI) frame), to indicate the reduced CBF to the AP. In particular, the STA may include the calculated average channel and the calculated differential measurements within the CBF report field. Additionally or alternatively, the STA may include one or more bits within the MIMO control field to indicate support at the STA for using reduced CBF in response to the sounding signal. In some implementations, one or more bits within the MIMO control field may indicate one or more feedback reduction parameters used for determining the differential measurements or the reduced CBF.

In some implementations, the AP may determine the one or more feedback reduction parameters (for example, as part as part of a bi-directional joint optimization with the STA) and include the feedback reduction parameters as part of the sounding signaling. In particular, the AP may include the one or more feedback reduction parameters within a field of a null data packet announcement (NDPA) frame. The AP may also include an indication for support for reduced CBF operation at the AP within the field. For example, the AP may include the indications as part of a configured common information field or as part of an extended STA info field of the NDPA frame.

The AP may receive the feedback from the STA in response to the sounding signal, including receiving the reduced CBF from the STA that includes indications of the calculated average channel and the calculated differential measurements. Based on the reception, the AP may determine an effective channel (or beamforming parameters) for performing a subsequent beamformed transmission to the STA for SU communications or MU-MIMO communications.

Particular implementations of the subject matter described in the disclosure may be implemented to realize one or more potential advantages, particularly for EHT network environments. An EHT network may support 320 MHz or 160+160 MHz operating modes and may include device functionality for multi-antenna operations over multiple spatial streams (for example, 16 spatial streams). EHT network environments may support more complicated MIMO schemes (such as multi-AP joint transmission), which may involve increased channel feedback. In some implementations, the described techniques may reduce the signaling overhead utilized to provide channel feedback to the AP, as well as account for changes in channel characteristics. By reducing the signaling overhead used to provide channel feedback, the STA may reduce the number of feedback bits while maintaining signaling performance (for example, an effective signal-to-noise ratio) in EHT network environments.

FIG. 1 illustrates an example of a wireless communication network 100 that supports techniques for reducing feedback information. According to some aspects, the wireless communication network 100 can be an example of a WLAN such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof). The WLAN 100 may include numerous wireless communication devices such as an AP 105 and multiple STAs 115. Each of the STAs 115 also may be referred to as a mobile station (MS), a mobile device, a mobile handset, a wireless handset, an access terminal (AT), a user equipment (UE), a subscriber station (SS), or a subscriber unit, among other possibilities. The STAs 115 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 105 and an associated set of STAs 115 may be referred to as a basic service set (BSS), which is managed by the respective AP 105. The BSS is identified by a service set identifier (SSID) that is advertised by the AP 105. The AP 105 periodically broadcasts beacon frames ("beacons") to enable any STAs 115 within wireless range of the AP 105 to establish or maintain a respective communication link 120 (hereinafter also referred to as a "Wi-Fi link") with the AP 105. For example, the beacons can include an identification of a primary channel used by the respective AP 105 as well as a timing synchronization function for establishing or maintaining timing synchronization with the AP 105. The various STAs 115 in the WLAN are able to communicate with external networks as well as with one another via the AP 105 and the respective communication links 120. To establish a Wi-Fi link 120 with an AP 105, each of the STAs 115 is configured to perform passive or active scanning operations ("scans") on frequency channels in one or more frequency bands (for example, the 2.4 GHz, 5 GHz, 6 GHz or 60 GHz bands). To perform passive scanning, a STA 115 listens for beacons, which are transmitted by the respective APs 105 at a periodic time interval referred to as the target beacon transmission time (TBTT), which may, for example, be measured in time units (TUs). In some examples, one TU is equal to 1054 microseconds (s)). To perform active scanning, a STA 115 generates and sequentially transmits probe requests on each channel to be scanned and listens for probe responses from the APs 105. Each STA 115 may be configured to identify or select an AP 105 with which to associate based on the scanning information obtained through the passive or active scans. Each STA 115 may be further configured to perform authentication and association operations to establish a Wi-Fi link 120 with the selected AP 105.

FIG. 1 additionally shows an example coverage area 110 of the AP 105, which may represent a basic service area (BSA) of the WLAN 100. While only one AP 105 is shown, the WLAN 100 can include multiple APs 105. As a result of the increasing ubiquity of wireless networks, a STA 115 may have the opportunity to select one of many BSSs within range of the STA 115 or select from among multiple APs 105 that together form an extended service set (ESS) including multiple connected BSSs. An extended network station associated with the WLAN 100 may be connected to a wired or wireless distribution system that may allow multiple APs 105 to be connected in such an ESS. As such, a STA 115 can be covered by more than one AP 105 and can associate with different APs 105 at different times for different transmissions. Additionally, after association with an AP 105, a STA 115 also may be configured to periodically scan its surroundings to find a more suitable AP 105 with which to associate. For example, a STA 115 that is moving relative to its associated AP 105 may perform a "roaming" scan to find another AP 105 having more desirable network characteristics such as a greater received signal strength indicator (RSSI) or a reduced traffic load.

In some examples, the STAs 115 may form networks without the APs 105 or other equipment other than the STAs 115 themselves. One example of such a network is an ad hoc network (or wireless ad hoc network). Ad hoc networks may alternatively be referred to as mesh networks or peer-to-peer (P2P) connections. In some examples, ad hoc networks may be implemented within a larger wireless network such as the WLAN 100. In such implementations, while the STAs 115 may be capable of communicating with each other through the AP 105 using communication links 120, the STAs 115 also can communicate directly with each other via direct wireless links 125. Additionally, two STAs 115 may communicate via a direct communication link 125 regardless of whether both STAs 115 are associated with and served by the same AP 105. In such an ad hoc system, one or more of the STAs 115 may assume the role filled by the AP 105 in a BSS. Such a STA 115 may be referred to as a group owner (GO) and may coordinate transmissions within the ad hoc network. Examples of direct wireless links 125 include Wi-Fi Direct connections, connections established by using a Wi-Fi Tunneled Direct Link Setup (TDLS) link, and other P2P group connections.

The APs 105 and the STAs 115 may function and communicate (via the respective Wi-Fi links 120) according to the IEEE 802.11 family of standards (such as that defined by the IEEE 802.11-2016 specification or amendments thereof including, but not limited to, 802.11ah, 802.11ay, 802.11ax, 802.11az, 802.11ba and Extremely High Throughput (EHT)). These standards define the WLAN radio and baseband protocols for the physical (PHY) and medium access control (MAC) layers. The APs 105 and the STAs 115 transmit and receive wireless communications (hereinafter also referred to as "Wi-Fi communications") to and from one another in the form of PHY protocol data units (PPDUs). The APs 105 and the STAs 115 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 105 and STAs 115 described herein also may communicate in other frequency bands, such as the 6 GHz band, which may support both licensed and unlicensed communications. The APs 105 and STAs 115 also can be configured to communicate over other frequency bands such as shared licensed frequency bands. In some examples, multiple operators may have a license to operate in the same or overlapping frequency band or bands.

Access to the shared wireless medium is governed by a Distributed Coordination Function (DCF). With a DCF, there is no centralized master device allocating time and frequency resources of the shared wireless medium. On the contrary, before a wireless communication device, such as an AP 105 or a STA 115, is permitted to transmit data, the device may wait for a particular time and then contend for access to the wireless medium. In some implementations, the wireless communication device may be configured to implement the DCF through the use of Carrier Sense Multiple Access (CSMA) with Collision Avoidance (CA) (CSMA/CA) and timing intervals. Before transmitting data, the wireless communication device may perform a Clear Channel Assessment (CCA) and determine that the appropriate wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine whether the channel is busy. Physical carrier sensing also includes energy detection. Energy detection involves measuring the total energy the wireless communication device receives regardless of whether the received signal represents a valid frame. If the total energy detected is above a threshold, the medium is considered busy. Virtual carrier sensing is accomplished via the use of a Network Allocation Vector (NAV), an indicator of a time when the medium may next become idle. The NAV is reset each time a valid frame is received that is not addressed to the wireless communication device. The NAV effectively serves as a time duration that may elapse before the wireless communication device may contend for access even in the absence of a detected symbol or a detected energy below the relevant threshold.

As described above, the DCF is implemented through the use of time intervals. These time intervals include the slot time (or "slot interval") and the Inter-Frame Space (IFS). The slot time is the basic unit of timing and may be determined based on one or more of a transmit-receive turnaround time, a channel sensing time, a propagation delay and a MAC processing time. Measurements for channel sensing are performed for each slot. All transmissions may begin at slot boundaries. Different varieties of IFS exist including the short IFS (SIFS), the distributed IFS (DIFS), the extended IFS (EIFS), and the arbitration IFS (AIFS). For example, the DIFS may be defined as the sum of the SIFS and two times the slot time. The values for the slot time and IFS may be provided by a suitable standard specification, such as the IEEE 802.11 family of standards (such as that defined by the IEEE 802.11-2016 specification or amendments).

When the NAV reaches 0, the wireless communication device performs the physical carrier sensing. If the channel remains idle for the appropriate IFS (for example, the DIFS), the wireless communication device initiates a back off timer, which represents a duration of time that the device may sense the medium to be idle before the device is permitted to transmit. The back off timer is decremented by one slot each time the medium is sensed to be idle over a corresponding slot interval. If the channel remains idle until the back off timer expires, the wireless communication device becomes the holder of a Transmit Opportunity (TXOP) and may begin transmitting. The TXOP is the duration of time the wireless communication device can transmit frames over the channel after the device has won contention for the wireless medium. If, on the other hand, one or more of the carrier sense mechanisms indicate that the channel is busy, the MAC of the wireless communication device will not permit transmission.

Each time the wireless communication device generates a new PPDU for transmission in a new Transmit Opportunity (TXOP), the device randomly selects a new back off timer duration. The available distribution of the numbers that may be randomly selected for the back off timer is referred to as the Contention Window (CW). If, when the back off timer expires, the wireless communication device transmits the PPDU but the medium is still busy or there is otherwise too much energy on the wireless channel, there may be a collision. In such instances, the wireless communication device may not receive an acknowledgement (ACK) acknowledging the transmitted PPDU within an ACK Time Out interval. The MAC may then increase the CW exponentially, for example, doubling it, before each attempted retransmission of the PPDU. There are different CW and TXOP durations for each of the four Access Categories (ACs): voice (AC_VO), video (AC_VI), background (AC_BK), and best effort (AC_BE). This enables particular types of traffic to be prioritized in the network.

Each of the frequency bands may include multiple sub-bands or frequency channels. For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz. But larger channels can be formed through channel bonding. For example, PPDUs conforming to the IEEE 802.11n, 802.11ac and 802.11ax standard amendments may be transmitted over physical channels having bandwidths of 40 MHz, 80 MHz or 160 MHz by bonding together two or more 20 MHz channels.

Each PPDU is a composite structure that includes a PHY preamble and a physical layer convergence protocol (PLCP) service data unit (PSDU). The information provided in the preamble may be used by a receiving device to decode the subsequent data in the PSDU. A legacy portion of the preamble may include a legacy short training field (STF) (L-STF), a legacy long training field (LTF) (L-LTF), and a legacy signaling field (L-SIG). The legacy preamble may be used for packet detection, automatic gain control and channel estimation, among other uses. The legacy preamble also may be used to maintain compatibility with legacy devices. In instances in which PPDUs are transmitted over a bonded channel, the L-STF, L-LTF, and L-SIG fields may be duplicated and transmitted in each of the multiple component channels. For example, in IEEE 802.11n, 802.11ac or 802.11ax implementations, the L-STF, L-LTF, and L-SIG fields may be duplicated and transmitted in each of the component 20 MHz channels. The format of, coding of, and information provided in the non-legacy portion of the preamble is based on the particular IEEE 802.11 protocol.

The APs 105 and the STAs 115 can support multi-user (MU) transmissions; that is, concurrent transmissions from one device to each of multiple devices (for example, multiple simultaneous downlink (DL) communications from an AP 105 to corresponding STAs 115), or concurrent transmissions from multiple devices to a single device (for example, multiple simultaneous uplink (UL) transmissions from corresponding STAs 115 to an AP 105). To support the MU transmissions, the APs 105 and STAs 115 may utilize multi-user orthogonal frequency division multiple access (MU-OFDMA).

In MU-OFDMA schemes, the available frequency spectrum of the wireless channel may be divided into a numerical quantity of resource units (RUs) each including a numerical quantity of different frequency subcarriers ("tones"). Different RUs may be allocated or assigned by an AP 105 to different STAs 115 at particular times. The sizes and distributions of the RUs may be referred to as an RU allocation. RUs may be allocated in 2 MHz intervals, and as such, the smallest RU includes 26 tones consisting of 24 data tones and 2 pilot tones. As such, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Therefore, it may be possible to schedule as many as 74 STAs 115 for MU-OFDMA transmissions. Larger 52 tone, 120 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For uplink (UL) MU transmissions, an AP 105 can transmit a trigger frame to initiate and synchronize an UL MU-OFDMA from multiple STAs 115 to the AP 105. Such trigger frames may thus enable multiple STAs 115 to send UL traffic to the AP 105 concurrently in time. A trigger frame may address one or more STAs 115 through respective association identifiers (AIDs), and may assign each AID one or more RUs that can be used to send UL traffic to the AP 105. The AP also may designate one or more random access (RA) RUs that unscheduled STAs 115 may contend for.

In some examples, some types of STAs 115 or APs 105 may be configured for EHT operations and support functionality on a dynamic channel bandwidth spectrum. The dynamic channel bandwidth spectrum may be a portion of frequency spectrum that includes frequency bands of the above radio frequency (RF) spectrum, including frequency bands traditionally used for Wi-Fi technology (for example, the 2.4 GHz or 5 GHz bands) or the emerging 6 GHz band. Each band includes multiple 20 MHz channels, which may be bonded together to form larger channels (such as 40 MHz, 80 MHz, 160 MHz, and 320 MHz channels), each of which may be usable by the configured APs 105 or STAs 115.

The APs 105 and the STAs 115 may support beamforming. Beamforming refers to the focusing of the energy of a transmission in the direction of a target receiver. Beamforming may be used both in a single user context, for example, to improve an SNR), as well as in a multi-user context, for example, to enable MU-MIMO transmissions. To perform beamforming, a transmitter, referred to as the beamformer, transmits a signal from multiple antenna elements of an antenna array. The beamformer configures the phase shifts between the signals transmitted from the different antenna elements such that the signals add constructively along particular directions towards the intended receivers, which are referred to as beamformees. The manner in which the beamformer configures the phase shifts depends on channel state information associated with the wireless channels over which the beamformer intends to communicate with the beamformees. To obtain the channel state information, the beamformer may perform a channel sounding procedure with the beamformees. For example, the beamformer may transmit one or more sounding signals to the beamformees. The beamformees may then perform measurements of the channel based on the sounding signals and subsequently provide feedback to the beamformer based on the measurements, for example, in the form of a feedback matrix. The beamformer may then then generate a steering matrix for each of the beamformees based on the feedback and use the steering matrix to configure the phase shifts for subsequent transmissions to the beamformees.

WLAN 100 may further support MIMO wireless systems. Such systems may use a transmission scheme between a transmitter (for example, an AP 105) and a receiver (for example, a STA 115), where the transmitter, the receiver, or both are equipped with multiple antennas. For example, an AP 105 may have an antenna array with a numerical quantity of rows and columns of antenna ports that the AP 105 may use for beamforming in communication with a STA 115. Signals may be transmitted multiple times in different directions (for example, each transmission may be beamformed differently). In downlink MU-MIMO, the AP 105 may simultaneously send multiple streams to one or more STAs 115 by taking advantage of spatial diversity in transmission resources and multiple antennas. In uplink MU-MIMO, the data transmissions of one or more STAs 115 may be coordinated so that they are simultaneously received at the AP 105 over multiple spatial streams. In particular, for operations associated with EHT network environments, data transmissions may be coordinated for downlink MU-MIMO and uplink MU-MIMO over multiple (for example, 16) spatial streams.

To implement SU beamforming or MU-MIMO techniques, an AP 105 may use information about the characteristics of the downlink and uplink channels of the operating bandwidth (for example, how the channel affects a packet, in terms of phase, amplitude, frequency). For example, the AP 105 may determine the properties of the downlink and uplink channels so that the AP 105 may beamform (for example, direct) the signals for STAs 115 and the signal intended for one STA does not severely interfere with the signal intended for another STA.

Determining the properties of a channel may also be referred to as estimating the channel. An AP 105 may estimate a channel by obtaining information indicative of the impact a channel has on a signal during propagation. In some examples, the AP 105 may obtain this information by receiving feedback signaling from one or more STAs 115 in response to a sounding signal that is transmitted by the AP 105. For example, a STA 115 may receive a sounding signal from the AP 105 and provide an indication of channel feedback to the AP 105 that spans a numerical quantity of feedback bits. In some implementations, the STA 115 may derive information of the channel feedback by measuring known training symbols within the sounding signal. For example, a STA 115 that receives a sounding signal may measure the long training field (LTF) symbols in a packet of the sounding signal to determine the effects of the channel on the packet from the AP 105. Further, the LTF symbols may promote frequency or timing pre-correction to reduce impairments for the channel feedback, such as offsets (for example, frequency, power).

For example, to perform channel estimation, an AP 105 may compute the complete channel response ($H_{UL}$) for the uplink channel and the complete channel response ($H_{DL}$) for the downlink channel. The complete channel response H may be represented or computed as H=USV*, where U represents the unitary matrix, S represents the signal strength (for example, SNR) in terms of eigenvalues, and V represents the eigenvectors of the channel response H (V* represents the conjugate transpose, or Hermitian transpose, of V).

The AP 105 may rely on a STA 115 to report downlink channel information in order to estimate the downlink channel. For example, the STA 115 may report S and V, but not U. The STA 115 may provide the channel information to the AP 105 as part of a Compressed Beamforming Report Information included in a CBF report field of an action frame (for example, a Compressed Beamforming and CQI frame). The included report information may be dependent on a value of a feedback type subfield included within the MIMO control field of the action frame.

Signaling over multiple spatial streams (for example, 16 spatial streams), as in EHT environments, may increase the dimensionality of reported S and V matrices. For example, a size of the S and V matrices or a quantity of items in the S and V matrices may increase as the quantity of spatial streams increases. The increased dimensionality of the S and V matrices may increase the number of reported feedback bits by the STA, as shown below in Tables 1 and 2.

TABLE 1

| Scheme | Size of V (Nr × Nc) | Number of angles (Na) | (bφ + bψ)/2 | Ns | Bits for SNR feedback | Number of feedback bits |
|---|---|---|---|---|---|---|
| Existing | 16 × 2 | 58 | 5 (CB Info = 1) | 250 (Ng = 4) | 8*2 | 72516 |
|  | 16 × 2 | 58 | 3 (CB Info = 0) | 64 (Ng = 16) | 8*2 | 11152 |

TABLE 2

| Scheme | Size of V (Nr × Nc) | Number of angles (Na) | (bφ + bψ)/2 | Ns | Bits for SNR feedback | ΔSNR | Number of feedback bits |
|---|---|---|---|---|---|---|---|
| Existing | 16 × 2 | 58 | 8 (CB Info = 1) | 250 (Ng = 4) | 8*2 | 4*2 | 118016 |
|  | 16 × 2 | 58 | 6 (CB Info = 0) | 64 (Ng = 16) | 8*2 | 4*2 | 22800 |

For example, Table 1 indicates a V matrix for CBF associated with 16×2 transmission for SU-MIMO operation. Based on the code block information (CB Info) (such as 0 or 1) and the tone grouping ($N_g$) the STA 115 may transmit the CBF. The CBF may be signaled for each tone grouping ($N_g$). The total number of feedback bits may be determined according to Equation (1) below.

$$\text{Number of feedback bits} = Na*(b\phi+b\psi)/2*Ns+SNR \text{ bits} \quad (1)$$

As another example, Table 2 indicates a V matrix for CBF associated with 16×2 transmission for MU-MIMO operation. Based on the code block information (CB Info) value (such as 0 or 1) and the tone grouping ($N_g$) the STA 115 may transmit the CBF. The total number of feedback bits may include a signal-to-noise ratio differential for each tone of the tone grouping ($N_g$) denoted as ΔSNR. The total number of feedback bits may be determined according to Equation (2) below.

$$\text{Number of feedback bits} = Na*(b\phi+b\psi)/2*Ns+SNR \text{ bits}+\Delta SNR*Ns \quad (2)$$

The total number of feedback bits may increase non-linearly in relation to an increase in the dimensionality for the reported V matrix. For example, as the dimensionality of the V matrix increases for CBF, the number of feedback bits may increase. The increase in the number of feedback bits may be based on the bandwidth used by the STA 115 for calculating an average channel, as well as the tone grouping ($N_g$) for the STA 115 to signal the calculated average channel to the AP 105, as shown below.

TABLE 3

| Size of V (Nr × Nc) | Number of angles (Na) | Number of feedback bits (80 MHz, CB Info = 1, Ng = 4) | Number of feedback bits (80 MHz, CB Info = 0, Ng = 16) | Number of feedback bits for (320 MHz, CB Info = 1, Ng = 4) | Number of feedback bits for (320 MHz, CB Info = 0, Ng = 16) |
|---|---|---|---|---|---|
| 2 × 1 | 2 | 2,508 | 392 | 10,008 | 1,544 |
| 8 × 1 | 14 | 17,508 | 2,696 | 70,008 | 10,760 |
| 8 × 2 | 26 | 32,516 | 5,008 | 130,016 | 19,984 |
| 8 × 8 | 56 | 70,064 | 10,816 | 280,064 | 43,072 |
| 16 × 1 | 30 | 37,508 | 5,768 | 150,008 | 23,048 |
| 16 × 2 | 58 | 72,516 | 11,152 | 290,016 | 44,560 |
| 16 × 8 | 184 | 230,064 | 35,392 | 920,064 | 141,376 |
| 16 × 16 | 240 | 300,128 | 46,208 | 1,200,128 | 184,448 |

Figure 2:
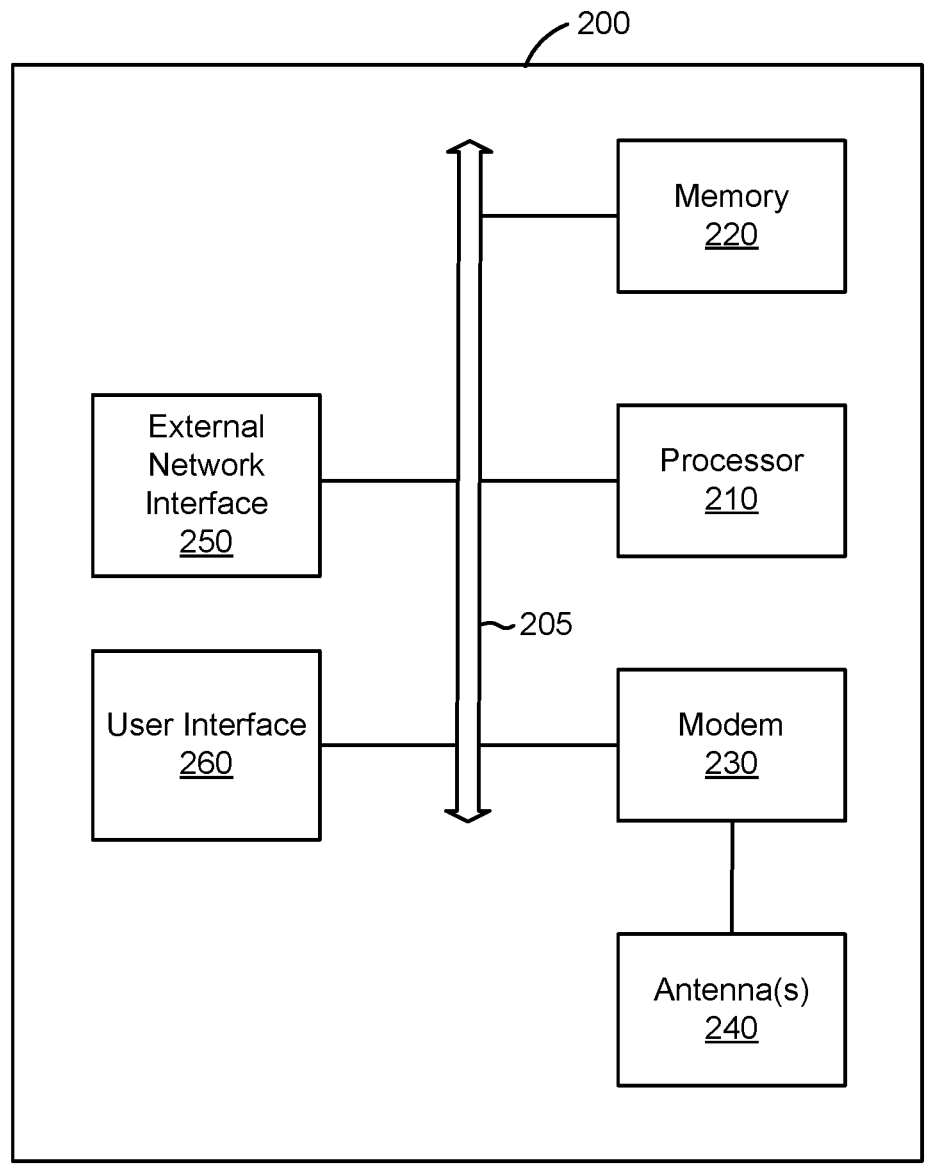
FIG. 2 shows a block diagram of an example access point (AP) that supports techniques for reducing feedback information in accordance with aspects of the present disclosure.

FIG. 2 shows a block diagram of an example AP 200 that supports techniques for reducing feedback information. For example, the AP 200 may be an example of aspects of the AP 105 described with reference to FIG. 1. The AP 200 is capable of transmitting and receiving wireless communications (for example, in the form of wireless packets), as well as encoding and decoding such communications. For example, the wireless communications can include Wi-Fi packets including frames conforming to an IEEE 802.11 standard (such as that defined by the IEEE 802.11-2016 specification or amendments thereof including, but not limited to, 802.11ah, 802.11ay, 802.11ax, 802.11az, and 802.11ba). The AP 200 includes at least one processor 210 (collectively "the processor 210"), at least one memory 220 (collectively "the memory 220"), at least one modem 230 (collectively "the modem 230"), at least one antenna 240 (collectively "the antenna 240"), at least one external network interface 250 (collectively "the network interface 250") and, in some instances, a user interface (UI) 260. Each of the components (or "modules") described with reference to FIG. 2 can communicate with other ones of the components, directly or indirectly, over at least one bus 205.

The processor 210 can include an intelligent hardware device such as, for example, a central processing unit (CPU), a microcontroller, an application-specific integrated circuit (ASIC), or a programmable logic device (PLD) such as a field programmable gate array (FPGA), among other possibilities. The processor 210 processes information received through the modem 230 and the external network interface 250. The processor 210 also can process information to be sent to the modem 230 for transmission through the antenna 240 and information to be sent to the external network interface 250. The processor 210 can generally be configured to perform various operations related to generating and transmitting a downlink frame and receiving an uplink frame.

The memory 220 can include random access memory (RAM) and read-only memory (ROM). The memory 220 also can store processor- or computer-executable software (SW) code containing instructions that, when executed by the processor 210, cause the processor to perform various functions described herein for wireless communication, including generation and transmission of a downlink frame and reception of an uplink frame.

The modem 230 is generally configured to modulate packets and to provide the modulated packets to the antenna 240 for transmission, as well as to demodulate packets received from the antenna 240 to provide demodulated packets. The modem 230 generally includes or is coupled with at least one radio frequency (RF) transmitter and at least one RF receiver, which may be combined into one or more transceivers, and which are in turn coupled to one or more antennas 240. For example, in some AP implementations, the AP 200 can include multiple transmit antennas (each with a corresponding transmit chain) and multiple receive antennas (each with a corresponding receive chain). The modem 230 can communicate bi-directionally, via the antenna 240, with at least one STA (such as the STA 105 as described with reference to FIG. 1).

The modem 230 may include digital processing circuitry, automatic gain control (AGC), a demodulator, a decoder and a demultiplexer. The digital signals received from the transceivers are provided to digital signal processing circuitry configured to acquire a received signal, for example, by detecting the presence of the signal and estimating the initial timing and frequency offsets. The digital signal processing circuitry is further configured to digitally condition the digital signals, for example, using channel (narrowband) filtering, analog impairment conditioning, such as correcting for I/Q imbalance, and applying digital gain to ultimately obtain a narrowband signal. The output of the digital signal processing circuitry is fed to the AGC, which is configured to use information extracted from the digital signals, for example, in one or more received training fields, to determine an appropriate gain. The output of the digital signal processing circuitry also is coupled with the demodulator, which is configured to extract modulated symbols from the signal and to reverse map the symbols to points in a modulation constellation to provide demodulated bits. The demodulator is coupled with the decoder, which is configured to decode the demodulated bits to provide decoded bits, which are then fed to the demultiplexer for demultiplexing. The demultiplexed bits may then be provided to the processor 210 for processing, evaluation or interpretation, for example, by one or more host applications executing on the processor.

The AP 200 may communicate with a core or backhaul network through the external network interface 250 to gain access to external networks including the Internet. For example, the external network interface 250 may include one or both of a wired (for example, Ethernet) network interface or wireless (for example, LTE, 4G or 5G) network interface.

The AP 200 may be configured to perform techniques for reducing feedback information in a WLAN. The AP 200 may receive a reduced set of feedback information from a STA in response to the AP 200 transmitting a sounding signal. In some implementations, the AP 200 may be configured to indicate a feedback reduction parameter to the STA.

Figure 3:
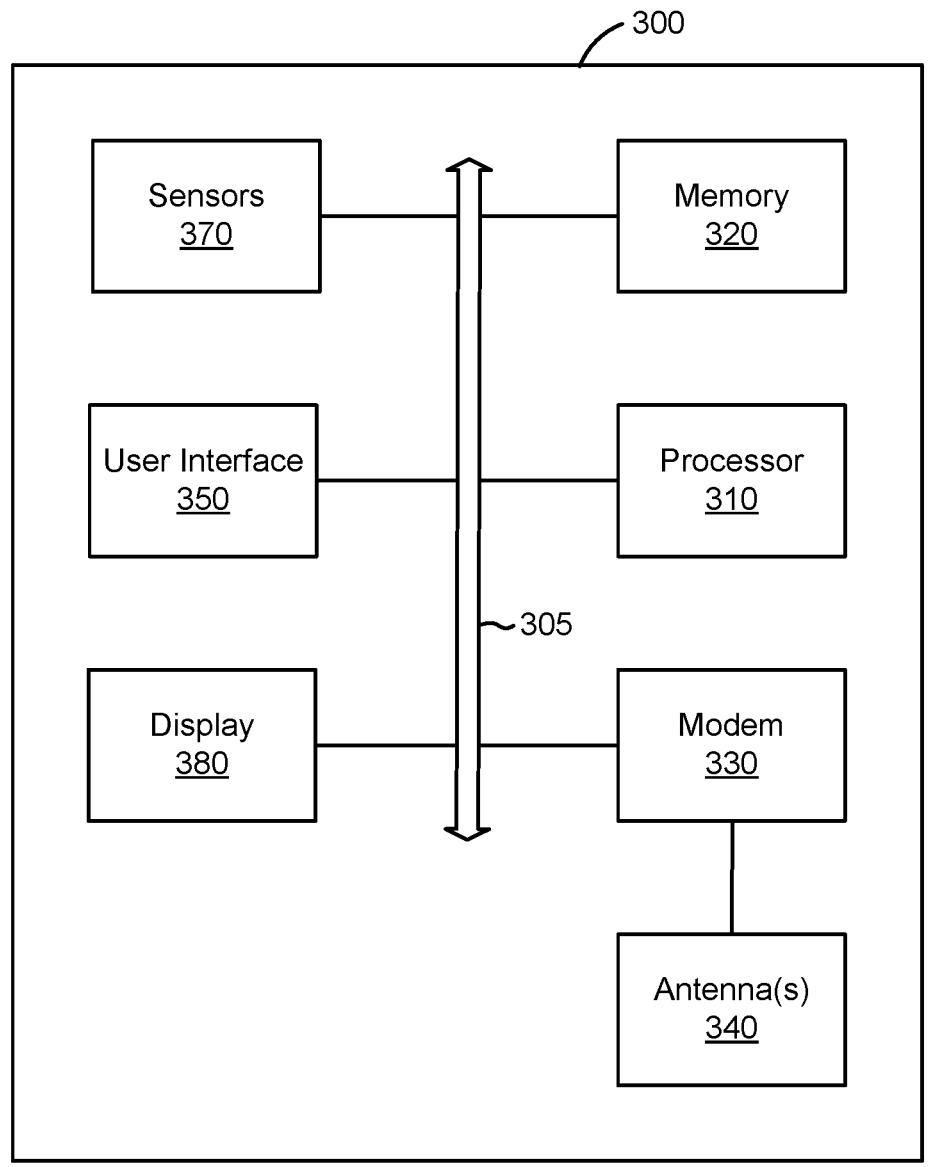
FIG. 3 shows a block diagram of an example wireless station (STA) that supports techniques for reducing feedback information in accordance with aspects of the present disclosure.

FIG. 3 shows a block diagram of an example wireless STA 300 that supports techniques for reducing feedback information. For example, the STA 300 may be an example of aspects of the STA 115 described with reference to FIG. 1. The STA 300 is capable of transmitting and receiving wireless communications, as well as of encoding and decoding such communications. The wireless communications may conform to any of a numerical quantity of different wireless communication protocols. For example, the STA 300 may be capable of transmitting and receiving Wi-Fi packets including frames conforming to an IEEE 802.11 standard, such as defined by the IEEE 802.11-2016 specification or amendments thereof including, but not limited to, 802.11ah, 802.11ay, 802.11ax, 802.11az, and 802.11ba). Additionally or alternatively, the STA 300 may be capable of transmitting and receiving Bluetooth packets conforming to a Bluetooth standard, such as defined in IEEE 802.15 or by the Bluetooth Special Interest Group. Additionally or alternatively, the STA 300 may be capable of transmitting and receiving wireless packets associated with the LTE, International Mobile Telecommunications-Advanced (IMT-Advanced) 4G or 5G standards.

The STA 300 includes at least one processor 310 (collectively "the processor 310"), at least one memory 320 (collectively "the memory 320"), at least one modem 330 (collectively "the modem 330") and at least one antenna 340 (collectively "the antenna 340"). In some implementations, the STA 300 additionally includes some or all of the following: a user interface (UI) 350 (such as a touchscreen or keypad), one or more sensors 370 (such as one or more inertial sensors, accelerometers, temperature sensors, pressure sensors, or altitude sensors), and a display 380. Each of the components (or "modules") described with reference to FIG. 3 can communicate with one another, directly or indirectly, over at least one bus 305.

The processor 310 includes an intelligent hardware device such as, for example, a CPU, a microcontroller, an ASIC or a PLD such as an FPGA, among other possibilities. The processor 310 processes information received through the modem 330 as well as information to be sent to the modem 330 for transmission through the antenna 340. The processor 310 can be configured to perform various operations related to receiving a downlink frame and generating and transmitting an uplink frame.

The memory 320 can include RAM and ROM. The memory 320 also can store processor- or computer-executable SW code containing instructions that, when executed, cause the processor 310 to perform various functions described herein for wireless communication, including reception of a downlink frame and generation and transmission of an uplink frame.

The modem 330 is generally configured to modulate packets and provide the modulated packets to the antenna 340 for transmission, as well as to demodulate packets received from the antenna 340 to provide demodulated packets. The modem 330 generally includes or is coupled with at least one radio frequency (RF) transmitter and at least one RF receiver, which may be combined into one or more transceivers, and which are in turn coupled to one or more antennas 340. For example, in some implementations, the STA 300 can include multiple transmit antennas (each with a corresponding transmit chain) and multiple receive antennas (each with a corresponding receive chain). The modem 330 can communicate bi-directionally, via the antenna 340, with at least one AP (such as the AP 102 or AP 200 described with reference to FIGS. 1 and 4, respectively). As is described above, in some implementations, the modem can also communicate bi-directionally, via the antenna 340, with other STAs directly without the use of an intermediary AP.

The modem 330 may include digital processing circuitry, automatic gain control (AGC), a demodulator, a decoder and a demultiplexer. The digital signals received from the transceivers are provided to digital signal processing circuitry configured to acquire a received signal, for example, by detecting the presence of the signal and estimating the initial timing and frequency offsets. The digital signal processing circuitry is further configured to digitally condition the digital signals, for example, using channel (narrowband) filtering, analog impairment conditioning, such as correcting for I/Q imbalance, and applying digital gain to ultimately obtain a narrowband signal. The output of the digital signal processing circuitry is fed to the AGC, which is configured to use information extracted from the digital signals, for example, in one or more received training fields, to determine an appropriate gain. The output of the digital signal processing circuitry also is coupled with the demodulator, which is configured to extract modulated symbols from the signal and to reverse map the symbols to points in a modulation constellation to provide demodulated bits. The demodulator is coupled with the decoder, which is configured to decode the demodulated bits to provide decoded bits, which are then fed to the demultiplexer for demultiplexing. The demultiplexed bits may then be provided to the processor 310 for processing, evaluation or interpretation, for example, by one or more host applications executing on the processor.

The STA 300 may be configured to perform techniques for reducing feedback information in a WLAN. The STA 300 may determine and transmit a reduced set of feedback information to an AP in response to the STA 300 receiving a sounding signal from the AP. In some implementations, the STA 300 may be configured to determine a set of differential channel characteristics as well.

Figure 4:
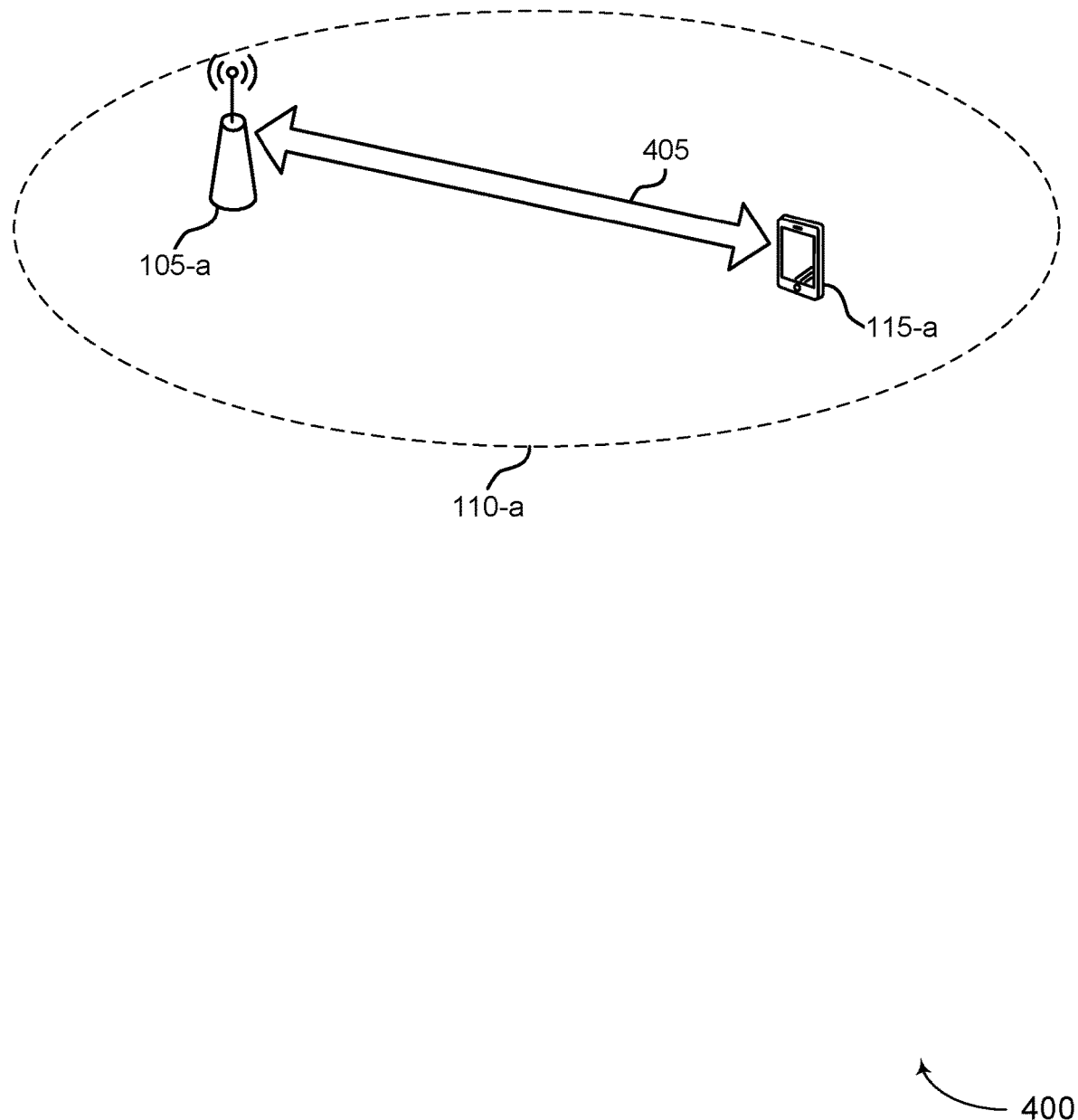
FIG. 4 illustrates an example of a wireless communications system that supports techniques for reducing feedback information in accordance with aspects of the present disclosure.

FIG. 4 illustrates an example of a wireless communications system 400 that supports techniques for reducing feedback information. Wireless communications system 400 may include an AP 105-*a* and STA 115-*a*, which may be examples of the corresponding devices described with reference to FIGS. 1 through 3. The AP 105-*a* may communicate with wireless devices, including the STA 115-*a*, inside a coverage area 110-*a*. The communication may be over an extended operating bandwidth for EHT operation, including 320 MHz or 160+160 MHz operating bandwidth spectrum. The AP 105-*a* may communicate using a variety of techniques, including beamforming, single-user MIMO (SU-MIMO), or MU-MIMO. The AP 105-*a* and the STA 115-*a* may support multi-antenna operations over multiple of spatial streams (for example, 16 spatial streams) as part of the communication.

The AP 105-*a* may use beamforming to steer downlink MU-MIMO transmissions to STAs 115-*a* within the coverage area 110-*a*, including STA 115-*a*. The AP 105-*a* may transmit on one or more spatial streams using multiple antennas. Additionally, the transmissions may be associated with a communication link 405 that spans time and frequency resources associated with EHT functionality. In some examples, the resources may include an extended channel bandwidth spectrum spanning 320 MHz or 160+160 MHz frequency bandwidth spectrum.

Prior to transmitting a SU beamformed signal or a MU-MIMO signal over a channel, the AP 105-*a* may first perform a channel sounding procedure. According to the techniques described herein, the AP 105-*a* may transmit a sounding signal via one or more spatial streams as part of the channel sounding procedure. The sounding signal may be or include a null data packet (NDP). The channel sounding procedure may further include the transmission of an NDPA frame before the NDP is transmitted. The AP 105-a may configure the NDPA frame to include one or more indications for performing reduced CBF at the STA 115-a. For example, the NDPA frame may be formatted to include at least one bit to indicate a reduced CBF operation, as well as index subfields of the NDPA announcement frame to indicate one or more feedback reduction parameters. The one or more feedback reduction parameters may include a reduction value or an averaging bandwidth. The STA 115-a may receive the sounding signal and process the included indications of the NDPA announcement frame. In some implementations, the averaging bandwidth may refer to the bandwidth over which an average of a channel is determined.

Following the sounding signal reception, the STA 115-a may determine an estimate of the channel. The STA 115-a may perform the channel estimate based on a reduced CBF operation. For example, the STA 115-a may determine a first set of channel characteristics that may include an average channel of the operating bandwidth. The STA 115-a may then select a subset (also referred to as a second set of channel characteristics) of the first set of channel characteristics based on the one or more feedback reduction parameters. In some examples, the STA 115-a may reduce one or more columns of a calculated average channel matrix as part of the selecting. Additionally, the STA 115-a may determine a set of differential characteristics based on the subset. By selecting a subset of the first set of channel characteristics, the STA 115-a may reduce the total number of feedback bits sent to the AP 105-a, and thereby reduce signaling overhead associated with the channel estimation.

The STA 115-a may configure an action field of an action frame (for example, an action field of a Compressed Beamforming and CQI frame) to transmit the reduced CBF to the AP 105-a. In some examples, the action frame may include a MIMO control field to include at least one bit to indicate support at the STA 115-a for reduced CBF operation. Additionally or alternatively, the MIMO control field may include one or more index subfields to indicate a reduction value or an averaging bandwidth associated with the one or more feedback reduction parameters (for example as part of a bidirectional joint optimization).

The STA 115-a may also configure the action frame to include at least the selected subset of the average channel and the set of differential characteristics. For example, the STA 115-a may include the subset and differential characteristics as Compressed Beamforming Report Information formatted within a Compressed Beamforming report field. The STA 115-a may then transmit the action frame, including the MIMO control field and Compressed Beamforming report field, to the AP 105-a.

The AP 105-a may receive the reduced CBF from the STA 115-a and process the included subset of the first set of channel characteristics (also referred to as the second set of channel characteristics) and the set of differential characteristics. Based on the processing, the AP 105-a may determine an effective channel on one or more subcarriers of the operating bandwidth for use by beamformed transmissions. The AP 105-a may then transmit a beamformed signal over the channel. The beamformed signal may be an example of a SU beamformed signal or MU-MIMO signal. The described techniques may reduce signaling overhead and simplify processing duties at the STA 115-a. The described techniques may further improve channel determination while maintaining signaling performance. For example, the techniques may maintain an effective signal-to-noise ratio at the STA 115-a while reducing the number of feedback bits transmitted by the STA 115-a.

Figure 5:
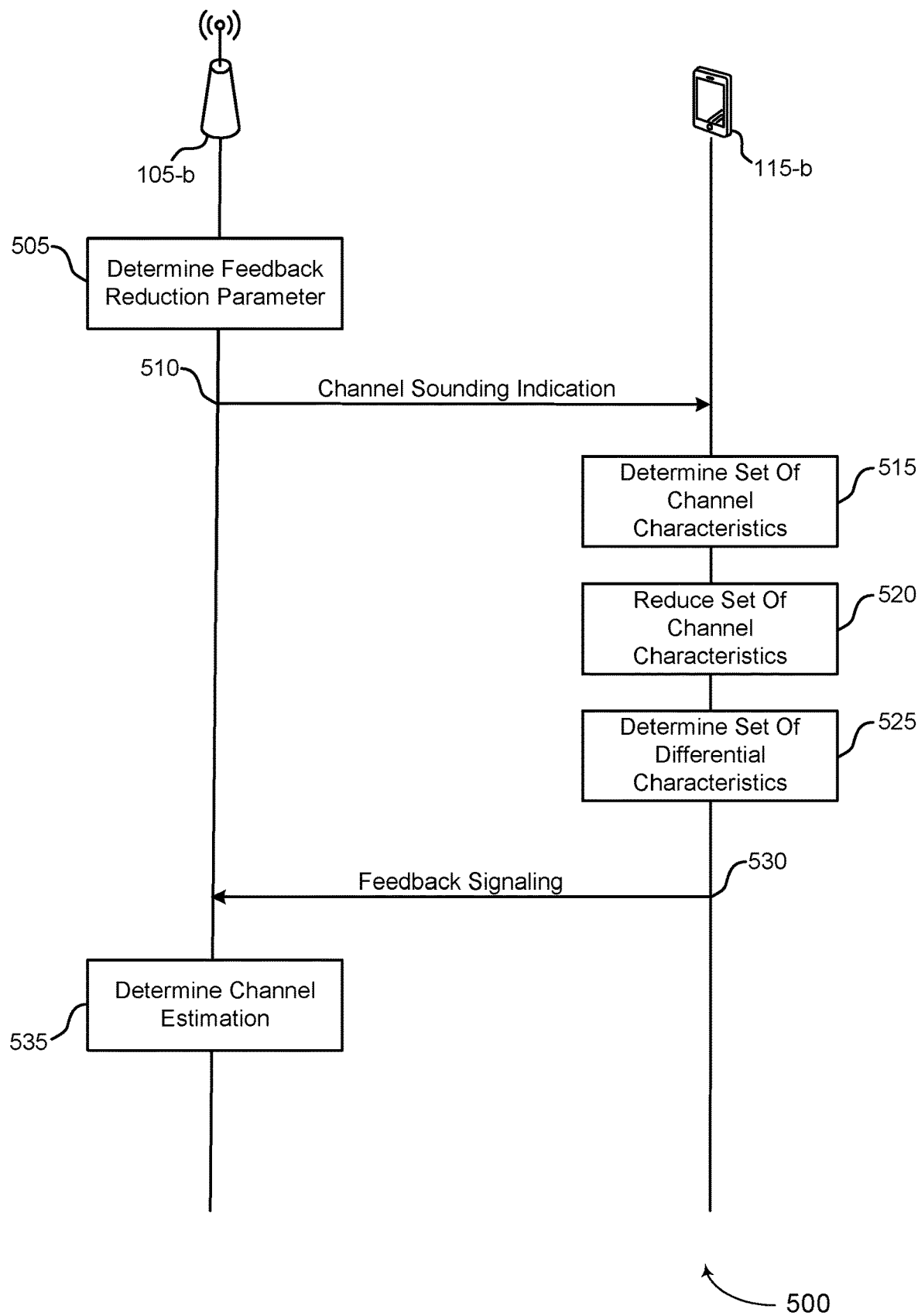
FIG. 5 illustrates an example of a process flow that supports techniques for reducing feedback information in accordance with aspects of the present disclosure.

FIG. 5 illustrates an example of a process flow 500 that supports techniques for reducing feedback information. Process flow 500 may include an AP 105-b and STA 115-b, which may be examples of the corresponding devices described with reference to FIGS. 1 through 4. Communications between an AP 105-b and a STA 115-b may be over an extended operating bandwidth, including 320 MHz or 160+160 MHz operating bandwidth spectrum. The AP 105-b may communicate with the STA 115-b using a variety of techniques, including beamforming, single-user MIMO (SU-MIMO), and MU-MIMO. The AP 105-b and the STA 115-b may support multi-antenna operations and transmit signaling over multiple spatial streams (for example, 16 spatial streams) as part of the communication. For example, the AP 105-a may use beamforming to steer downlink MIMO transmissions to the STAs 115 and reduce signaling interference on the channel for targeted downlink signaling to the STAs 115.

The AP 105-a may be an example of a beamformer, and support transmission over a downlink channel of the operating bandwidth. In some implementations, the STA 115-b may be an example of a beamformer, and may support transmission over an uplink channel of the operating bandwidth. The AP 105-b may transmit sounding signal to the STA 115-b, as part of a channel measurement procedure. The AP 105-b may support reduced CBF operation for the channel measurement procedure. In some examples, the sounding signal may include an NDPA frame. Prior to transmitting the sounding signal, the AP 105-b may determine one or more feedback reduction parameters to include within the NDPA frame.

For example, at 505, the AP 105-b may configure the NDPA frame to include one or more feedback reduction parameters, for subsequent channel measurement and feedback estimate at the beamformee (for example, STA 115-b). The one or more feedback reduction parameters may include a reduction value for performing an average channel calculation. In some examples, the reduction value may correspond to a numerical quantity of antennas or spatial streams. The one or more feedback reduction parameters may also include an averaging bandwidth for calculating the average channel. In some examples, such as SU-MIMO communications, the AP 105-b may indicate an averaging bandwidth corresponding to the entire operating bandwidth. In other cases, such as MU-MIMO communications, signaling may be more sensitive to decoherence and impedance. In order to maintain a desired signal performance threshold (for example, an effective SNR) the AP 105-b may indicate a local averaging bandwidth corresponding to a sub-bandwidth of the operating bandwidth.

In some examples, the AP 105-b may configure the NDPA frame to include at least one bit to indicate a reduced CBF operation. The AP 105-b may format the NDPA frame to include the at least one indictor bit. In some implementations, the indicator bit may be an example of at least one feedback reduction parameter. In some examples, the AP 105-b may include the indication for reduced CBF within one or more STA-specific info fields of the NDPA frame. Additionally or alternatively, the AP 105-b may include the feedback reduction parameters in one or more STA-specific info fields of the NDPA frame. In other examples, the AP 105-b may configure the NDPA frame to include a common info field (for example, as part of a trigger frame structure), and format the common info field to include the indicator bit for reduced CBF, or the one or more feedback reduction parameters or both. The common info field may be included as part of an extended STA info field for the formatting of the NDPA frame.

At 510, the AP 105-*b* may transmit the sounding signal as part of an NDPA frame directed to at least the STA 115-*b*. The AP 105-*b* may transmit the sounding signal over a set of transmit chains corresponding to one or more spatial streams. The AP 105-*b* may also transmit a capability bit to the STA 115-*b*, to indicate that the AP 105-*b* is capable of using reduced CBF. In some implementations, the AP 105-*b* may communicate the one or more feedback reduction parameters to the STA 115-*b*. In other implementations, the AP 105-*b* may communicate the feedback reduction parameters using another frame, signal, or message.

The STA 115-*b* may receive the sounding signal 510 from the AP 105-*b* over the one or more spatial streams. At 515, the STA 115-*b* may determine a set of channel characteristics associated with reduced CBF to send to the AP 105-*b* in response to receiving the sounding signal 510. The set of channel characteristics may include a calculated average channel of the operating bandwidth. For example, the STA 115-*b* may receive the sounding signal from the AP 105-*b* and calculate an average channel $V_{avg}$. In some examples, calculated average channel $V_{avg}$ may be determined based on the relationship shown in Equation (3) below.

$$\underset{k}{E}(H'_k * H_k) = U_{avg} S_{avg} V'_{avg}, \tag{3}$$

where the dimensionality of $V_{avg}$ is $N_t * N_t$

In some examples, k may represent the subcarriers (or tone) index on the operating bandwidth. Additionally, $N_t$ may represent the number of antennas operable at the STA 115-*b* for signaling transmission by the STA 115-*b*.

At 520, to reduce signaling overhead, the STA 115-*b* may reduce the set of channel characteristics. For example, the STA 115-*b* may determine one or more feedback reduction parameters for reducing the dimensionality of the average channel matrix, $V_{avg}$. The one or more feedback reduction parameters may be configured by one or both of the STA 115-*b* or the AP 105-*b* (for example, as part of a bi-directional joint optimization). The one or more feedback reduction parameters may include at least a reduction value corresponding to a component of a transmit correlation matrix. In some examples, the one or more feedback reduction parameters may include a quantity of antennas or spatial streams. The STA 115-*b* may determine a subset of the calculated average channel matrix, $V_{avg}$, based on the reduction value. The one or more feedback reduction parameters may also include an averaging bandwidth for determining the calculated average channel $V_{avg}$. In some examples, the averaging bandwidth may be based on the MIMO operations associated with the communication between the AP 105-*b* and the STA 115-*b*. For example, in the case of SU-MIMO operations, the STA 115-*b* may determine the subset based on an averaging bandwidth that spans the full operating bandwidth or a sub-bandwidth of the operating bandwidth. In other cases, such as MU-MIMO operations, signaling may be more sensitive to decoherence and impedance. In order to maintain a signal performance threshold (for example, SNR), the STA 115-*b* may perform a localized average channel calculation for a sub bandwidth of the operating bandwidth.

Based on the one or more feedback reduction parameters, the STA 115-*b* may reduce the size of the calculated average channel, $V_{avg}$, by removing one or more columns and reducing the dimensionality of $V_{avg}$ from $N_t$ to K (for example, by removing one or more columns). In some implementations, the dimensionality of $V_{avg}$ may be based on the least significant eigenvalues of the signal strength matrix S computed as part of the channel response by STA 115-*b*. By reducing the dimensionality of $V_{avg}$, the STA 115-*b* may improve processing and overhead for potential feedback signaling to the AP 105-*b* by reducing the number of bits transmitted to the AP 105-*b* as part of the feedback information.

At 525, the STA 115-*b* may determine a set of characteristics corresponding to a differential between the measured channel of the received sounding signal and the calculated average channel $V_{avg}$. The set of differential characteristics may be represented as a differential matrix $V_{sc}$. The differential matrix, $V_{sc}$, may provide a per-tone channel projection associated with the averaging bandwidth. In some examples, the STA 115-*b* may measure the differential based on the relation provided in Equation (4) below.

$$H_k * V_{avg} = U_k S_k V'_k * V_{avg} = U_k S_k V'_{sc}, \text{ where} \\ V_{sc} = V'_{avg} * V_k \tag{4}$$

By reducing the dimensionality of the calculated average channel $V_{avg}$ (for example, by reducing the column dimensionality from $N_t$ to K by removing one or more columns), the STA 115-*b* may further reduce the dimensionality of the differential matrix $V_{sc}$. By reducing the dimensionality of the matrices $V_{avg}$ and $V_{sc}$, the STA 115-*b* may also reduce the total number of feedback bits transmitted to the AP 105-*b*.

In the case of SU-MIMO operations, the STA 115-*b* may reduce the total number of feedback bits, as shown in Table 4.

TABLE 4

| Scheme | Size of V (Nr × Nc) | Number of angles (Na) | (bφ + bψ)/2 | Ns | Bits for SNR feedback | Number of feedback bits |
|---|---|---|---|---|---|---|
| New Scheme | 8 × 2 | 26 | 5 (CB Info = 1) | 250 (Ng = 4) | 8*2 | 32615 |
|  | 8 × 2 | 26 | 3 (CB Info = 0) | 64 (Ng = 16) | 8*2 | 5008 |
|  | 16 × 8 | 184 | 5 (CB Info = 1) | 1 or 2 |  | 920 or 1840 |
|  | 16 × 8 | 184 | 3 (CB Info = 0) | 1 or 2 |  | 552 or 1254 |
| Existing | 16 × 2 | 58 | 5 (CB Info = 1) | 250 (Ng = 4) | 8*2 | 72516 |
|  | 16 × 2 | 58 | 3 (CB Info = 0) | 64 (Ng = 16) | 8*2 | 11152 |

For example, for 16×2 transmission, the STA 115-b may determine a calculated average channel $V_{avg}$ that is reduced to a smaller matrix. Additionally, the STA 115-b may determine a differential matrix $V_{sc}$ based on the reduced calculated average channel $V_{avg}$, and having a dimensionality of 8×2. The STA 115-b may transmit calculated average chanexample, SNR), the STA 115-b may perform localized average channel calculation on a sub bandwidth of the operating bandwidth. Using the localized average channel and reducing the set of channel characteristics, the STA 115-b may reduce the total number of feedback bits, as shown in Table 5, reproduced below.

TABLE 5

| Scheme | Size of V (Nr × Nc) | Number of angles (Na) | (bϕ + bψ)/2 | Ns | Bits for SNR feedback | ΔSNR | Number of feedback bits |
|---|---|---|---|---|---|---|---|
| New Scheme | 8 × 2 | 26 | 8 (CB Info = 1) | 250 (Ng = 4) | 8*2 | 4*2 | 54016 |
|  | 8 × 2 | 26 | 6 (CB Info = 0) | 64 (Ng = 16) | 8*2 | 4*2 | 10512 |
|  | 16 × 8 | 184 | 8 (CB Info = 1) | 8 or 16 |  |  | 11776 or 23552 |
|  | 16 × 8 | 184 | 6 (CB Info = 0) | 8 or 16 |  |  | 8832 or 17664 |
| Existing | 16 × 2 | 58 | 8 (CB Info = 1) | 250 (Ng = 4) | 8*2 | 4*2 | 118016 |
|  | 16 × 2 | 58 | 6 (CB Info = 0) | 64 (Ng = 16) | 8*2 | 4*2 | 22800 | nel $V_{avg}$ for the average bandwidth equal to the entire bandwidth of the channel sounding procedure or half of the bandwidth of the channel sounding procedure (for example $N_s$ of 1 or 2). The number of bits for signaling the determined differential matrix $V_{sc}$ may be based on value of a code book information (CB Info). For example, the number of bits for indicating each angle of the number of angles ($N_a$) may be based on the CB Info value, such as 0 or 1. Further, the STA 115-b may transmit the determined differential matrix $V_{sc}$ on each tone grouping ($N_g$) for the feedback (for example, on 250 occasions for a $N_g$ value of 4 or on 64 occasions of the operating bandwidth for a $N_g$ value of 16). The $N_g$ value may be based on the value of the CB Info. The total number of feedback bits may be determined according to Equation (1).

By determining a subset of the average channel $V_{avg}$ (reducing the dimensionality of $V_{avg}$) as well as reducing the dimensionality of the differential matrix $V_{sc}$, the STA 115-b may reduce the number of feedback bits sent to the AP 105-b while maintaining performance (such as effective signal-to-noise ratio). For example, in the case of SU-MIMO communications, for 80 MHz channel averaging using a configured tone grouping $N_g$ value of 4 (based on a CB Info value of 1), the STA 115-b may reduce the number of feedback bits by approximately 38,981 bits. In other examples, for 80 MHz channel averaging using a configured tone grouping $N_g$ value of 16 (based on a CB Info value of 0), the STA 115-b may reduce the number of feedback bits by approximately 5,592 bits. In other examples, for 40 MHz channel averaging using a configured tone grouping $N_g$ value of 4 (based on a CB Info value of 1) the STA 115-b may reduce the number of feedback bits by approximately 38,061 bits. In other examples, for 80 MHz channel averaging using a configured tone grouping $N_g$ value of 16 (based on a CB Info value of 0) the STA 115-b may reduce the number of feedback bits by approximately 5,040 bits. In each of the described examples, the STA 115-b may provide a 45-54 percent reduction in the number of feedback bits, while maintaining a performance loss around 1 dB for 80 MHz averaging and 0.25 dB for 40 MHz averaging.

In the case of MU-MIMO communications, signaling may be more sensitive to decoherence and impedance. In order to maintain a signal performance threshold (for example, SNR), the STA 115-b may perform localized average channel calculation on a sub bandwidth of the operating bandwidth. Using the localized average channel and reducing the set of channel characteristics, the STA 115-b may reduce the total number of feedback bits, as shown in Table 5, reproduced below.

For example, for a 16×2 transmission associated with MU-MIMO operations, the STA 115-b may determine a calculated average channel $V_{avg}$ that is reduced to a smaller matrix. Additionally, the STA 115-b may determine a differential matrix V s based on the determined subset of the calculated average channel and having a dimensionality of 8×2. The STA 115-b may transmit $V_{avg}$ on 8 or 16 tone occasions of the feedback. The number of bits for signaling the determined differential matrix V s may be based on a value of code book information (CB Info). For example, the number of bits for indicating each angle of the number of angles ($N_a$) may be based on the value of the CB Info (such as 0 or 1). Further, the STA 115-b may transmit the determined differential matrix $V_{sc}$ on each tone grouping for the feedback (for example, on 250 occasions for a $N_g$ value of 4 or on 64 occasions of the operating bandwidth for a $N_g$ value of 16). The $N_g$ value may be based on the value of the CB Info. The total number of feedback bits be determined according to Equation (2) above.

By determining a subset of the calculated average channel $V_{avg}$ (for example, reducing the dimensionality of $V_{avg}$), as well as the determined differential matrix $V_{sc}$, the STA 115-b may reduce the number of feedback bits for MU-MIMO communication, particularly in contexts with medium signal-to-noise ratio or high resolution feedback. For example, the STA 115-b may use 10 MHz channel averaging associated with a 30 dB signal-to-noise ratio, as well as a configured tone grouping $N_g$ value of 4 (based on a CB Info value of 1), and reduce the number of feedback bits by approximately 52,224 bits. In other examples, the STA 115-b may use 10 MHz channel averaging and a configured tone grouping $N_g$ value of 16 (based on a CB info value of 0), and may reduce the number of feedback bits by approximately 3,456 bits. In other examples, the STA 115-b may use a 5 MHz channel averaging associated with a 40 dB signal-to-noise ratio, as well as a configured tone grouping $N_g$ value of 4 (based on a CB Info value of 1), and may reduce the number of feedback bits by approximately 40,448 bits. In each of the described examples, the STA 115-b may provide a 15-44 percent reduction in the number of feedback bits, while maintaining a performance loss of less than 1 dB for 10 MHz averaging and less than 0.5 dB for 5 MHz averaging.

Additionally or alternatively, the STA 115-*b* may perform further averaging over larger bandwidths as part of one or more compression procedures to achieve further compression gain associated with the reduced CBF. That is, the STA 115-*b* may compress the average channel $V_{avg}$ with an averaging bandwidth that spans a larger portion of the operating bandwidth. The additional average channel calculations may be averaged according to a performance threshold (such as effective signal-to-noise ratio) for signaling by the STA 115-*b*.

After determining the calculated average channel matrix $V_{avg}$ and the differential matrix $V_{sc}$, the STA 115-*b* may then configure the feedback signaling 530 for transmitting at least the matrices $V_{avg}$ and $V_{sc}$. The feedback signaling may be associated with an action field of an action frame (for example, an action field of a Compressed Beamforming and CQI frame) and include one or more fields for the determined set of channel characteristics, as well as one or more additional indications associated with reduced CBF operation at the STA 115-*b*.

In some examples, the STA 115-*b* may configure a MIMO control field of the action frame to include one or more indications associated with providing reduced CBF to the AP 105-*b*. For example, the STA 115-*b* may configure at least one bit included in a reserved subfield of the MIMO control field to indicate operation at the STA 115-*b* for reduced CBF. Additionally or alternatively, the STA 115-*a* may extend one or more subfields of the MIMO control field (for example, $N_c$, $N_r$, and BW subfields) to include additional bits to support functionality associated with EHT operations on 320 MHz or 160+160 MHz bandwidth spectrum and multi-antenna operations over multiple (such as 16) spatial streams.

In some examples, the STA 115-*b* may configure the MIMO control field to include additional index subfields containing one or more feedback reduction parameters, for subsequent channel measurement and feedback estimation at the beamformer (for example, AP 105-*b*). That is, the STA 115-*b* may determine the one or more feedback reduction parameters in conjunction with the AP 105-*b*. In some examples, the feedback reduction parameters may include at least a reduction value corresponding to a numerical quantity of antennas or spatial streams for determining a subset of the calculated average channel. Additionally or alternatively, the one or more feedback reduction parameters may include an averaging bandwidth. In some examples, such as SU-MIMO communications, the STA 115-*b* may indicate an averaging bandwidth corresponding to the entire operating bandwidth. In other cases, such as MU-MIMO communication, signaling may be more sensitive to decoherence and impedance. In order to maintain a signal performance threshold (for example, SNR), the STA 115-*b* may indicate a local averaging bandwidth corresponding to a sub-bandwidth of the operating bandwidth.

Additionally, in some examples, the STA 115-*b* may configure a CBF report field of the action frame to include information of the CBF report. The information may include one or more indications of the reduced set of channel characteristics. For example, the STA 115-*b* may format the information associated with the CBF report to include the determined differential characteristics, as indicated by the differential matrix $V_{sc}$. In some examples, the STA 115-*b* may format the information associated with the CBF report to include $V_{sc}$ in one or more fields of the report information (for example, for the associated feedback tones). The STA 115-*b* may also configure information associated with the CBF report to include the determined subset of the calculated average channel $V_{avg}$. In some examples, the STA 115-*b* may append the $V_{avg}$ matrix for one or more evaluated averaging bandwidths as feedback within the information associated with the CBF report (for example, following the included $V_{sc}$ for the associated feedback tones).

The STA 115-*b* may transmit the feedback signaling 530 as an action frame directed to AP 105-*b*. In some implementations, the action field may include at least the MIMO control field and CBF report field. In some implementations, the STA 115-*b* may transmit the feedback signaling 530 over a set of transmit chains. The set of transmit chains may correspond to one or more spatial streams. The STA 115-*b* may also transmit a capability bit to the AP 105-*b*, to indicate support for reduced CBF.

The AP 105-*b* may receive the feedback signaling 530 from STA 115-*b*. The AP 105-*b* may then process the included measurement values, including the $V_{avg}$ and $V_{sc}$ matrices of the received reduced CBF. Based on the processing, at 535, the AP 105-*b* may determine an effective channel on one or more subcarriers of the operating bandwidth.

One or more of the described features may be implemented by a beamformer or beamformee as part of a channel estimation procedure associated with beamformed transmissions on a channel. In some examples, the communications between the beamformer and beamformee may be associated with a downlink sounding signal and reduced CBF transmission, as well as subsequent data transmission (for example, directed transmissions as part of SU-beamformed or MU-MIMO transmission). In other cases, the communications between the beamformer and beamformee may be associated with an uplink sounding signal and reduced CBF transmission, and subsequent data transmission.

Figure 6:
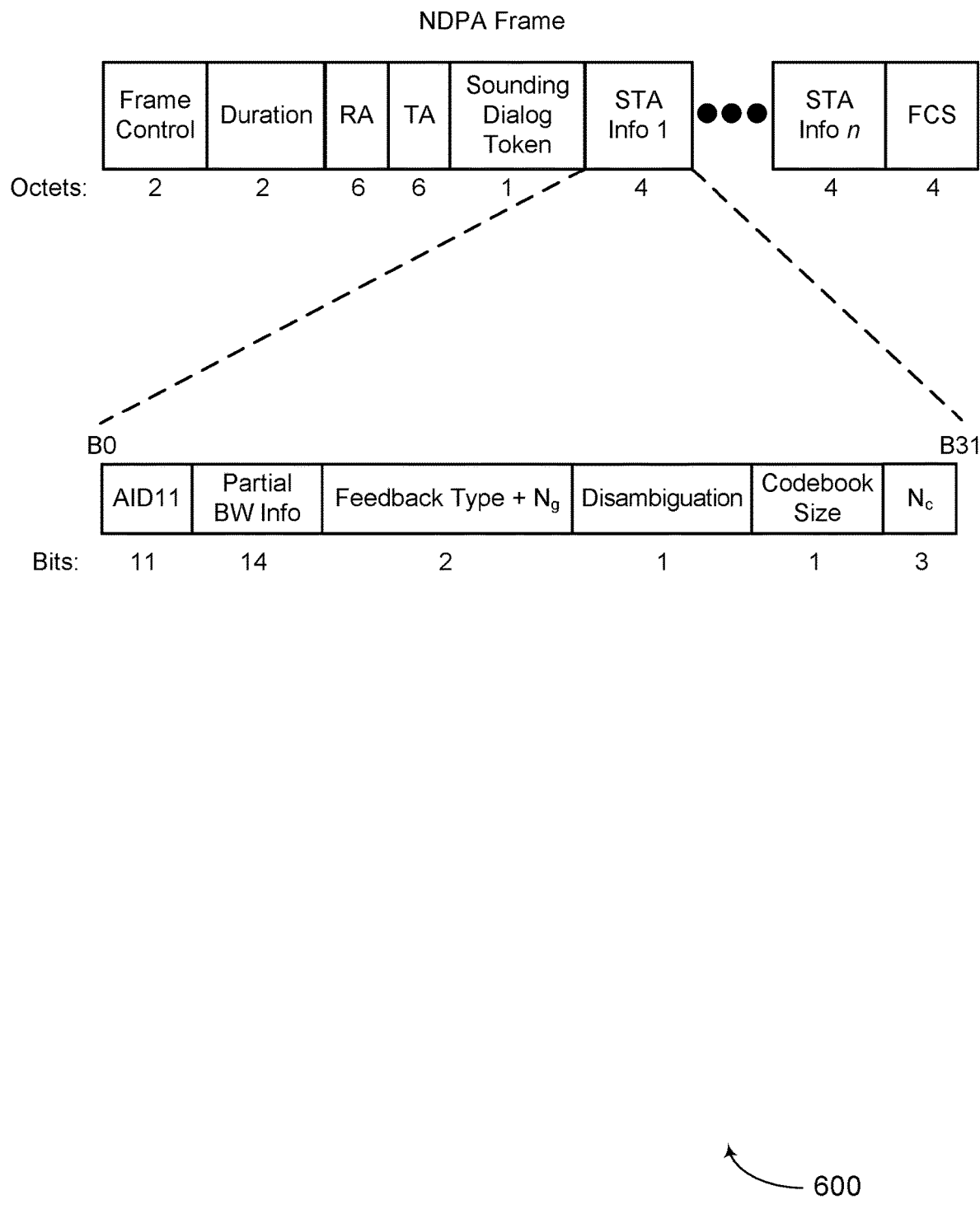
FIG. 6 illustrates an example of a null data packet announcement (NDPA) frame that supports techniques for reducing feedback information in accordance with aspects of the present disclosure.

FIG. 6 illustrates an example of an NDPA frame 600 that supports techniques for reducing feedback information. As shown, the NDPA frame may be formatted to support WLAN operations associated with EHT operating environments. In some examples, the NDPA frame may be an NDPA-MU frame for multi-user channel sounding procedure on the channel. A beamformer (for example, an AP 105, as described with reference to FIG. 1) may signal the NDPA frame as part of a channel sounding procedure, as described with reference to FIGS. 4 and 5.

In some examples, a beamformer may configure the NDPA frame to include at least one bit for indicating operation for reduced CBF. The beamformer may format the NDPA frame to include the bit indication for reduced CBF within one or more STA-specific info fields of the NDPA frame.

In some examples, the NDPA frame may be formatted to include one or more feedback reduction parameters for subsequent channel measurement and feedback estimate at the beamformee (for example, a STA 115, as described with reference to FIG. 1). The one or more feedback reduction parameters may include at least a reduction value for determining a set of channel characteristics. The reduction value may correspond to a component of a transmit correlation matrix. In some examples, the one or more feedback reduction parameters may include a numerical quantity of antennas or spatial streams for determining a subset of the calculated average channel. The one or more feedback reduction parameters may also include an averaging bandwidth. In some examples, such as SU-MIMO communication, the averaging bandwidth may correspond to the entire operating bandwidth. In other cases, such as MU-MIMO communication, signaling may be more sensitive to decoherence and impedance. In order to maintain a signal performance threshold (for example, SNR) the averaging bandwidth may correspond to a sub bandwidth of the operating bandwidth.

Additionally or alternatively, the beamformer may format the NDPA frame to include a common info field. The common info field may be signaled as an explicit field within the NDPA frame or as part of one or more expended STA info fields within the NDPA frame. For example, the beamformer may extend one or more STA info fields of the NDPA frame to be similar to a user info field of a trigger frame, with an extended bit allocation for sounding indication. In some examples, the beamformer may remove one or more subfields (for example, padding) of the NDPA to reduce signaling overhead (such as redundant fields). Additionally, the AP 105 may include one or more new fields for signaling indication within the NDPA frame.

A beamformee (for example, a STA 115, as described with reference to FIG. 1) may provide feedback signaling, as described with reference to FIGS. 4 and 5. The feedback signaling may be provided in response to the channel sounding procedure provided by a beamformer (for example, an AP 105, as described with reference to FIG. 1), and following one or more determinations associated with reduced CBF. In some examples, the feedback signaling may be part of an action field associated with an action frame (for example, a Compressed Beamforming and CQI frame) and include one or more fields for indicating reduced CBF operation by the beamformee.

Figure 7:
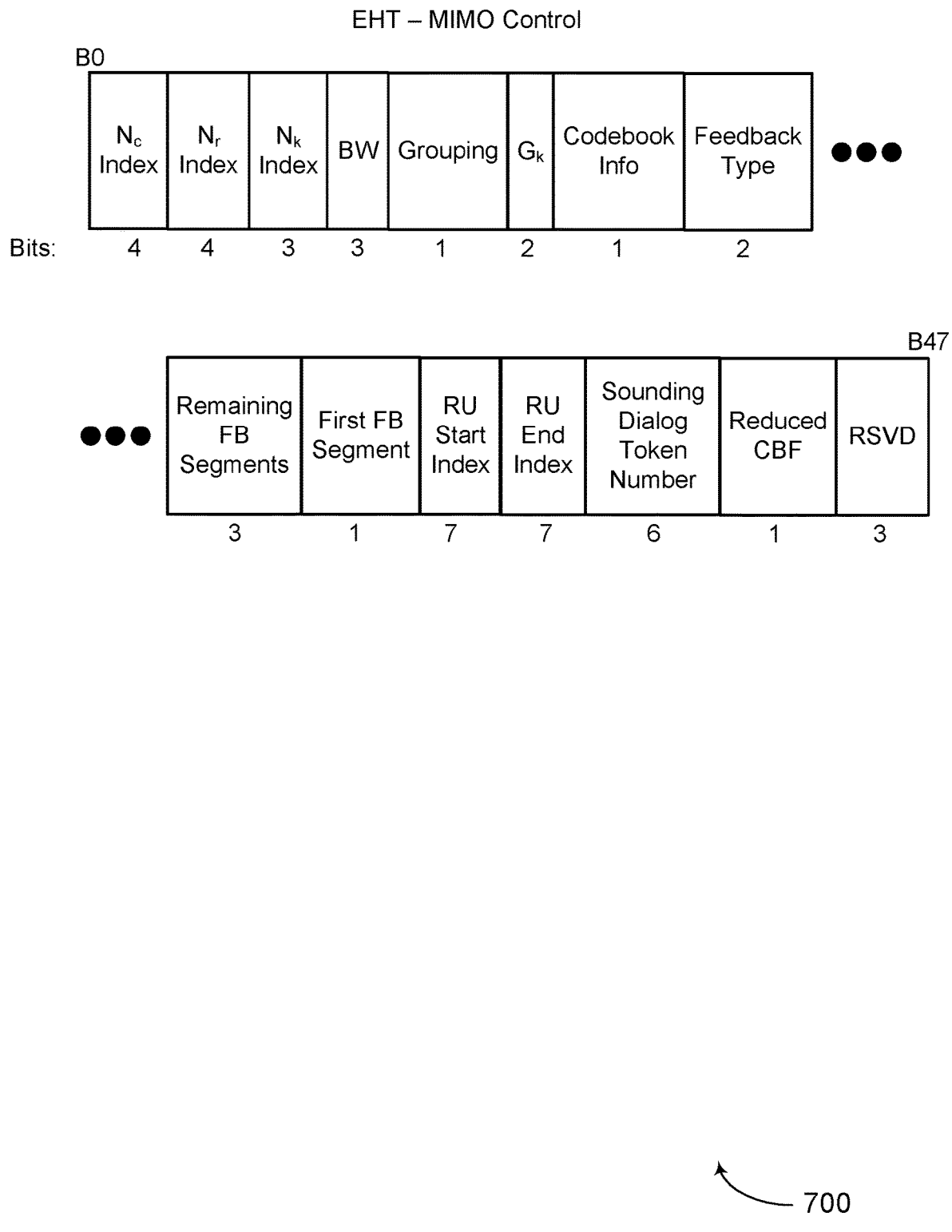
FIG. 7 illustrates an example of a multiple-input multiple-output (MIMO) control field associated with an action field that supports techniques for reducing feedback information in accordance with aspects of the present disclosure.

FIG. 7, illustrates an example of a MIMO control field 700 associated with an action field that supports techniques for reducing feedback information. As shown, the MIMO control field may be formatted to support WLAN operations associated with EHT operating environments.

In some examples, the MIMO control field may be configured to support one or more indications associated with reduced CBF. For example, the beamformee may configure at least one bit included in a reserved subfield of the MIMO control field to indicate operations at the beamformee for reduced CBF. Additionally or alternatively, the beamformee may extend one or more subfields of the MIMO control field (for example, $N_c$, $N_r$, and BW subfields) to include additional bits to support functionality associated with EHT operations on 320 MHz or 160+160 MHz bandwidth spectrum and multi-antenna operations over multiple (such as 16) spatial streams. For example, the $N_c$ subfield may be allocated 4 bits, the $N_r$ subfield may be allocated 4 bits, and the BW subfield may be allocated 3 bits for indicating EHT functionality.

In some examples, the beamformee may configure the MIMO control field to include one or more additional index subfields to include one or feedback reduction parameters. The one or more feedback reduction parameters may include at least a reduction value for determining a reduced average channel and an averaging bandwidth. In some examples, a new index subfield $N_k$ may be configured within the MIMO control field and span multiple bits (for example, 3 bits). The subfield $N_k$ may include an indication of the reduction value. The reduction value may correspond to a component of a transmit correlation matrix. The one or more feedback reduction parameters may indicate a numerical quantity of antennas operable at the beamformee or the number of spatial streams used by the beamformee for signaling. For example, the subfield $N_k$ may be formatted to indicate a reduction factor value from 8 to 16, for selecting a subset of the calculated average channel.

In other cases, a new index subfield $G_k$ may be configured within the MIMO control field and span multiple bits (for example, 2 bits). The subfield $G_k$ may include the averaging bandwidth. For example, the subfield $G_k$ may be formatted to indicate an averaging bandwidth of 5, 10, 40, or 80 MHz on the channel. In some examples, the averaging bandwidth indicated within the subfield $G_k$ may be based on a signal performance threshold (for example, SNR) and associated with communications (for example SU beamforming or MU-MIMO) on the channel.

Additionally, in some examples, the beamformee may configure a CBF report field to include one or more indications. The one or more indications may include at least the reduced set of channel characteristics (such as a reduced average channel matrix $V_{avg}$) and a set of differential characteristics (such as a differential matrix $V_{sc}$). As part of the reduced CBF, the beamformee may configure the CBF report information to include one or more fields for the one or more indications.

For example, for SU type feedback, the beamformee may format one or more fields of the CBF report information (for example, one or more CBF matrix fields) to include a $V_{sc}$ matrix for multiple feedback tones (for example, 1 to $N_s$) associated with the reduced CBF. In addition, the beamformee may append one or more fields within the CBF report information to include a $V_{avg}$ matrix for one or more averaging bandwidths (for example, 1 to $N_g$k) associated with the reduced CBF.

In other examples, such as MU-MIMO communications, the beamformee may format one or more fields of the Compressed Beamforming report information (for example, one or more CBF matrix fields) to include a $V_{sc}$ matrix for multiple feedback tones (for example, 1 to $N_s$) associated with the reduced CBF. In addition, the beamformee may append one or more fields within the CBF report information to include a $V_{avg}$ matrix for one or more averaging bandwidths (for example, 1 to $N_g$k) associated with the reduced CBF. In addition, the beamformee may format one or more additional fields of the action field (for example, a MU exclusive beamforming report field) to include determined signal-to-noise ratio differentials for each tone of the tone grouping ($N_g$), denoted as delta signal-to-noise ratios (ΔSNRs).

Figure 8:
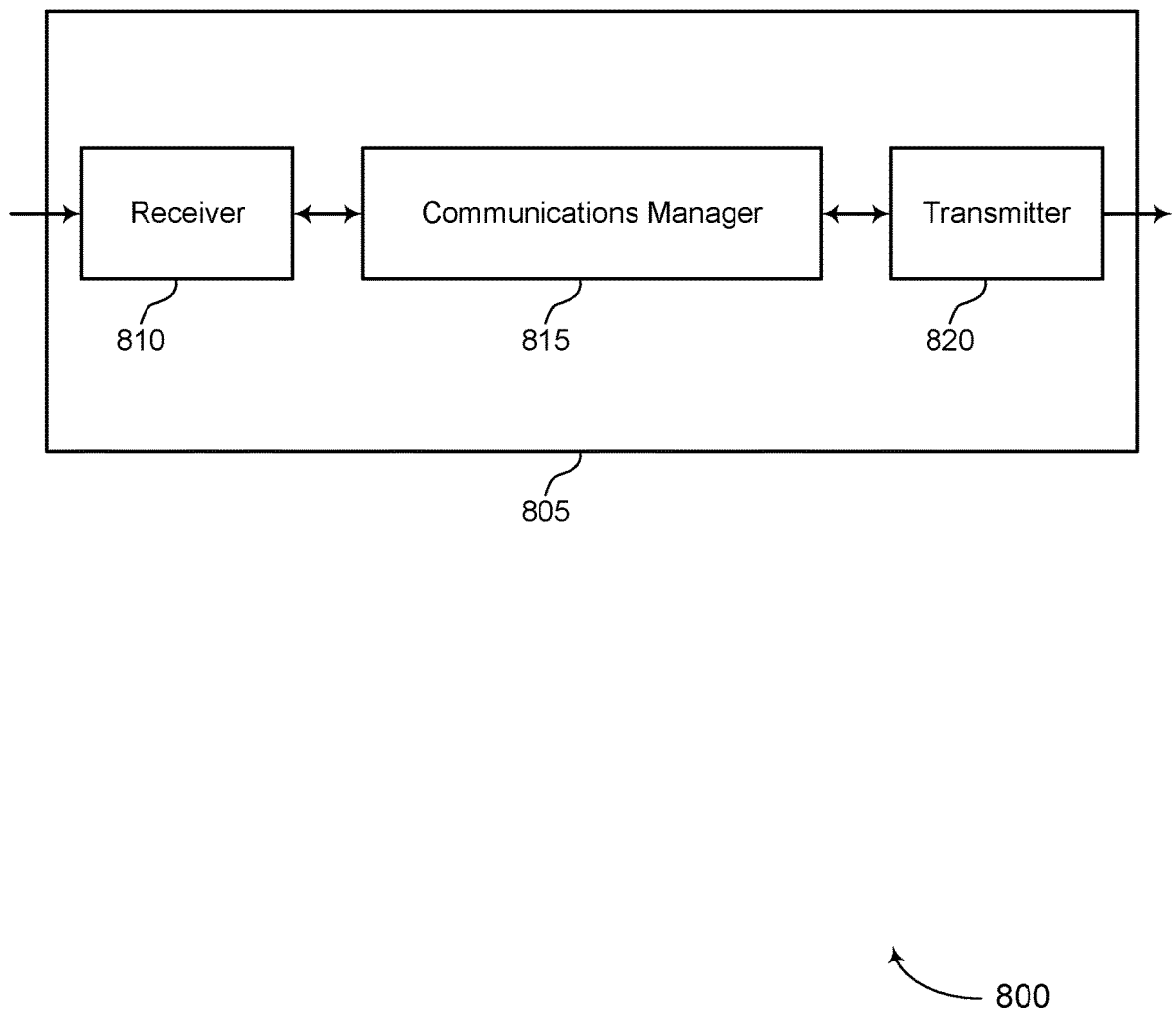
FIGS. 8 and 9 show block diagrams of devices that support techniques for reducing feedback information in accordance with aspects of the present disclosure.

FIG. 8 shows a block diagram 800 of a device 805 that supports techniques for reducing feedback information in accordance with aspects of the present disclosure. The device 805 may be an example of aspects of an AP as described herein. The device 805 may include a receiver 810, a communications manager 815, and a transmitter 820. The communications manager 815 can be implemented, at least in part, by one or both of a modem and a processor. Each of these components may be in communication with one another (for example, via one or more buses).

The receiver 810 may receive information such as packets, user data, or control information associated with various information channels (for example, control channels, data channels, and information related to techniques for reducing feedback information). Information may be passed on to other components of the device. The receiver 810 may be an example of aspects of the transceiver 1120 described with reference to FIG. 11. The receiver 810 may utilize a single antenna or a set of antennas.

The communications manager 815 may determine a feedback reduction parameter for a channel sounding procedure, transmit, to a STA, a sounding signal including one or more spatial streams transmitted over an operating bandwidth, and receive a set of channel characteristics from the STA based on transmitting the sounding signal, the set of channel characteristics having a reduced numerical quantity based on the feedback reduction parameter. The communications manager 815 may be an example of aspects of the communications manager 1110 described herein.

The transmitter 820 may transmit signals generated by other components of the device. In some examples, the transmitter 820 may be collocated with a receiver 810 in a transceiver component. For example, the transmitter 820 may be an example of aspects of the transceiver 1120 described with reference to FIG. 11. The transmitter 820 may utilize a single antenna or a set of antennas.

Figure 9:
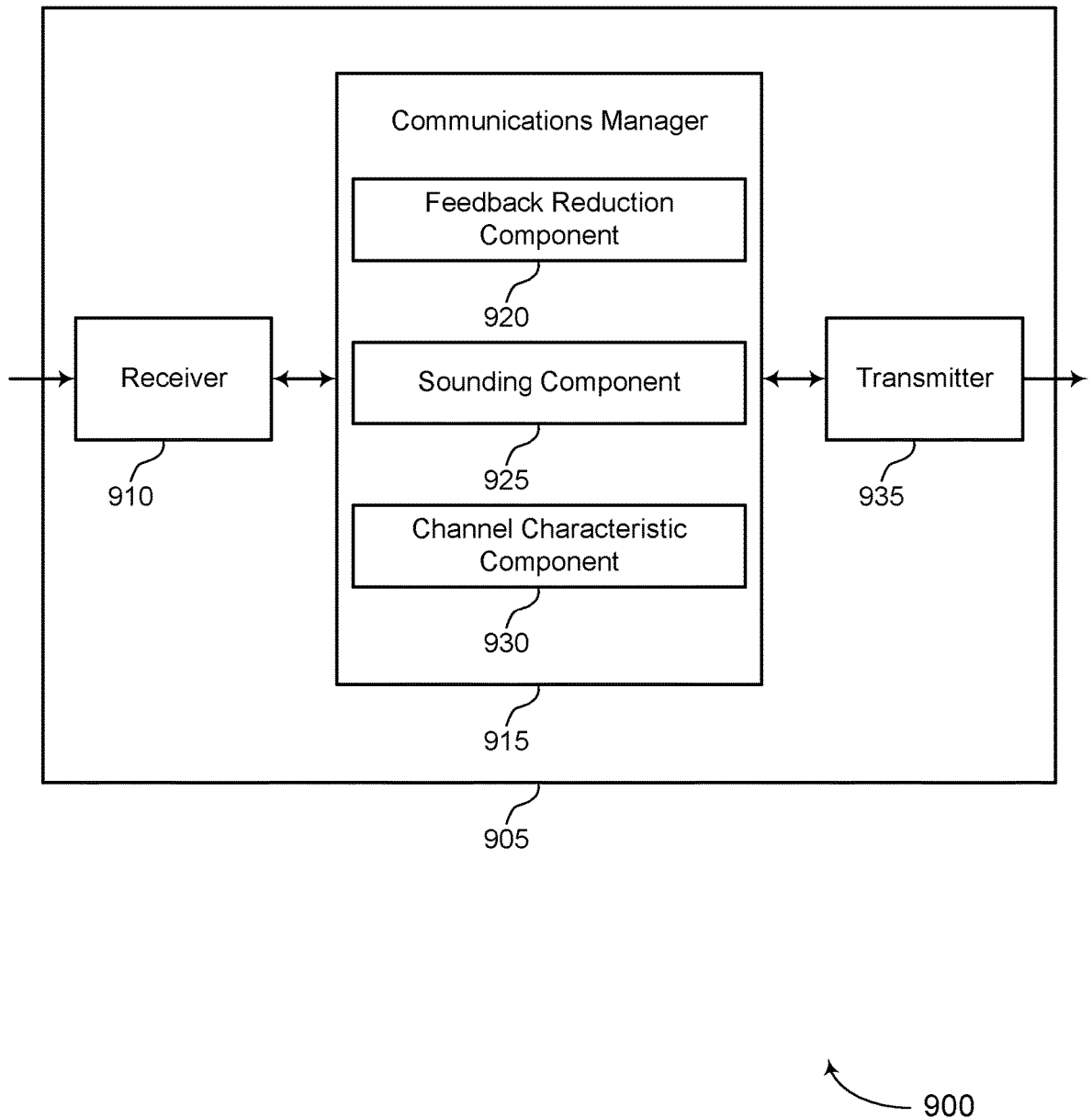

FIG. 9 shows a block diagram 900 of a device 905 that supports techniques for reducing feedback information in accordance with aspects of the present disclosure. The device 905 may be an example of aspects of a device 805 or an AP 105 as described herein. The device 905 may include a receiver 910, a communications manager 915, and a transmitter 935. The communications manager 915 can be implemented, at least in part, by one or both of a modem and a processor. Each of these components may be in communication with one another (for example, via one or more buses).

The receiver 910 may receive information such as packets, user data, or control information associated with various information channels (for example, control channels, data channels, and information related to techniques for reducing feedback information). Information may be passed on to other components of the device. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a feedback reduction component 920, a sounding component 925, and a channel characteristic component 930. The communications manager 915 may be an example of aspects of the communications manager 1110 described herein.

The feedback reduction component 920 may determine a feedback reduction parameter for a channel sounding procedure.

The sounding component 925 may transmit, to a STA, a sounding signal including one or more spatial streams transmitted over an operating bandwidth.

The channel characteristic component 930 may receive a set of channel characteristics from the STA based on transmitting the sounding signal, the set of channel characteristics having a reduced numerical quantity based on the feedback reduction parameter.

The transmitter 935 may transmit signals generated by other components of the device. In some examples, the transmitter 935 may be collocated with a receiver 910 in a transceiver component. For example, the transmitter 935 may be an example of aspects of the transceiver 1120 described with reference to FIG. 11. The transmitter 935 may utilize a single antenna or a set of antennas.

Figure 10:
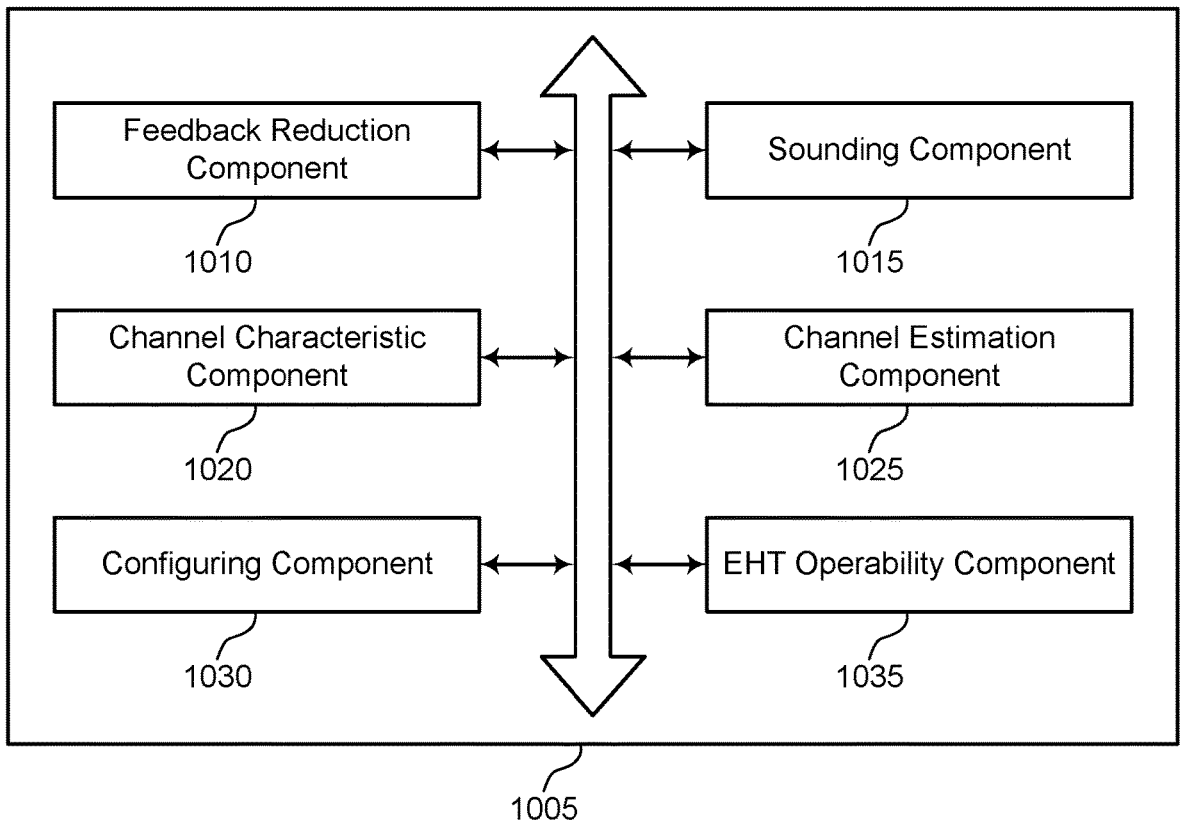
FIG. 10 shows a block diagram of a communications manager that supports techniques for reducing feedback information in accordance with aspects of the present disclosure.

FIG. 10 shows a block diagram 1000 of a communications manager 1005 that supports techniques for reducing feedback information in accordance with aspects of the present disclosure. The communications manager 1005 may be an example of aspects of a communications manager 815, a communications manager 915, or a communications manager 1110 described herein. The communications manager 1005 may include a feedback reduction component 1010, a sounding component 1015, a channel characteristic component 1020, a channel estimation component 1025, a configuring component 1030, and an EHT operability component 1035. Each of these components may communicate, directly or indirectly, with one another (for example, via one or more buses).

The feedback reduction component 1010 may determine a feedback reduction parameter for a channel sounding procedure.

In some examples, the feedback reduction component 1010 may transmit a frame formatted to include one or more indications of the feedback reduction parameter associated with the set of channel characteristics. In some examples, the feedback reduction component 1010 may configure at least one bit included in a field of the frame to indicate reduced compressed beamforming feedback. In some examples, the feedback reduction component 1010 may configure one or more index subfields of the frame to indicate a reduction value associated with the second set of channel characteristics, or an averaging bandwidth associated with the set of channel characteristics, or both. In some examples, the averaging bandwidth includes a reduced portion of the operating bandwidth.

The sounding component 1015 may transmit a sounding signal including one or more spatial streams transmitted over an operating bandwidth.

In some examples, the sounding component 1015 may transmit a capability bit to indicate support at the AP for reduced compressed beamforming feedback. In some examples, transmitting the sounding signal is based on transmitting the capability bit. In some examples, the frame includes a null data packet announcement frame. In some examples, the set of channel characteristics are received as part of a single user channel sounding procedure or as part of a multi-user channel sounding procedure.

The channel characteristic component 1020 may receive a set of channel characteristics from the STA based on transmitting the sounding signal, the set of channel characteristics having a reduced numerical quantity based on the feedback reduction parameter.

In some examples, the channel characteristic component 1020 may receive a set of differential characteristics from the STA, the set of differential characteristics received with the set of channel characteristics.

The channel estimation component 1025 may determine a channel on one or more subcarriers of the operating bandwidth based on the set of channel characteristics and the set of differential characteristics. In some examples, the channel estimation component 1025 may transmit a beamformed signal over the channel to the STA based on the determining.

The configuring component 1030 may configure at least one bit in a field of a frame to indicate a reduced compressed beamforming feedback operation. In some examples, field is a common information field. In some examples, the common information field is included as part of an extended STA info field of the frame.

The EHT operability component 1035 may configure one or more communication features for EHT functionality on the operating bandwidth. In some examples, the operating bandwidth includes a first bandwidth of at least 320 MHz or a second bandwidth including a first 160 MHz portion and a second non-adjacent 160 MHz portion. In some examples, the EHT operability includes multi-antenna operations over a set of spatial streams.

Figure 11:
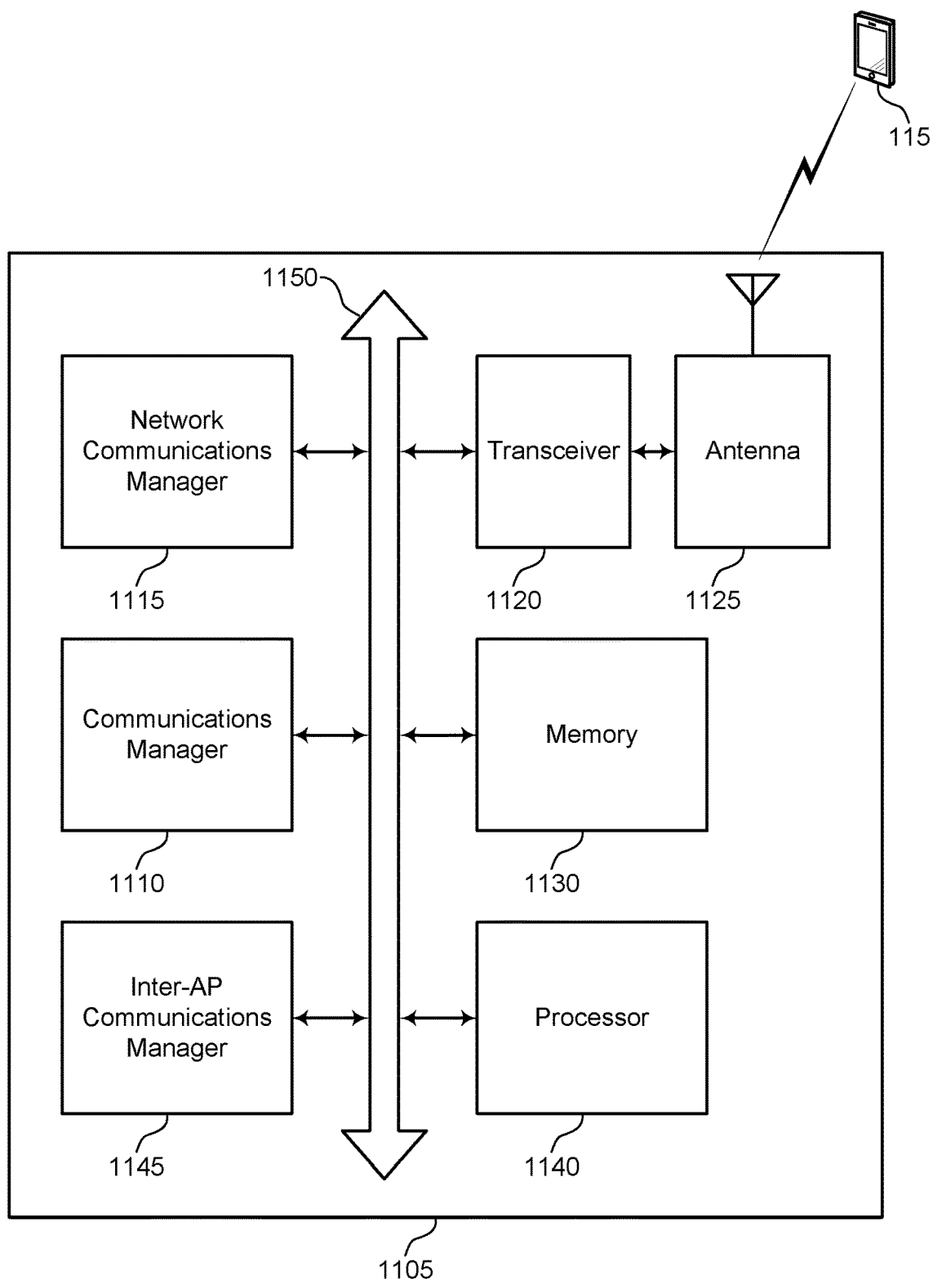
FIG. 11 shows a diagram of a system including a device that supports techniques for reducing feedback information in accordance with aspects of the present disclosure.

FIG. 11 shows a diagram of a system 1100 including a device 1105 that supports techniques for reducing feedback information in accordance with aspects of the present disclosure. The device 1105 may be an example of or include the components of device 805, device 905, or an AP as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-AP communications manager 1145. These components may be in electronic communication via one or more buses (for example, bus 1150).

The communications manager 1110 may determine a feedback reduction parameter for a channel sounding procedure, transmit, to a STA, a sounding signal including one or more spatial streams transmitted over an operating bandwidth, and receive a set of channel characteristics from the STA based on transmitting the sounding signal, the set of channel characteristics having a reduced numerical quantity based on the feedback reduction parameter.

The network communications manager 1115 may manage communications with the core network (for example, via one or more wired backhaul links). For example, the network communications manager 1115 may manage the transfer of data communications for client devices, such as one or more STAs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some examples, the wireless device may include a single antenna 1125. However, in some examples, the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some examples, the memory 1130 may contain, among other things, a basic input/output system (BIOS) which may control basic hardware or software operation such as the interaction with peripheral components or devices.

The processor 1140 may include an intelligent hardware device, (for example, a general-purpose processor, a digital signal processor (DSP), a CPU, a microcontroller, an ASIC, an FPGA, a programmable logic device, a discrete gate or transistor logic component, a discrete hardware component, or any combination thereof). In some examples, the processor 1140 may be configured to operate a memory array using a memory controller. In other cases, a memory controller may be integrated into processor 1140. The processor 1140 may be configured to execute computer-readable instructions stored in a memory to perform various functions (for example, functions or tasks supporting techniques for reducing feedback information).

The inter-AP communications manager 1145 may manage communications with other APs 105, and may include a controller or scheduler for controlling communications with STAs 115 in cooperation with other APs 105. For example, the inter-AP communications manager 1145 may coordinate scheduling for transmissions to STAs 115 for various interference mitigation techniques such as beamforming or joint transmission. In some examples, the inter-AP communications manager 1145 may provide an interface within a wireless communication network technology to provide communication between APs 105.

Figure 12:
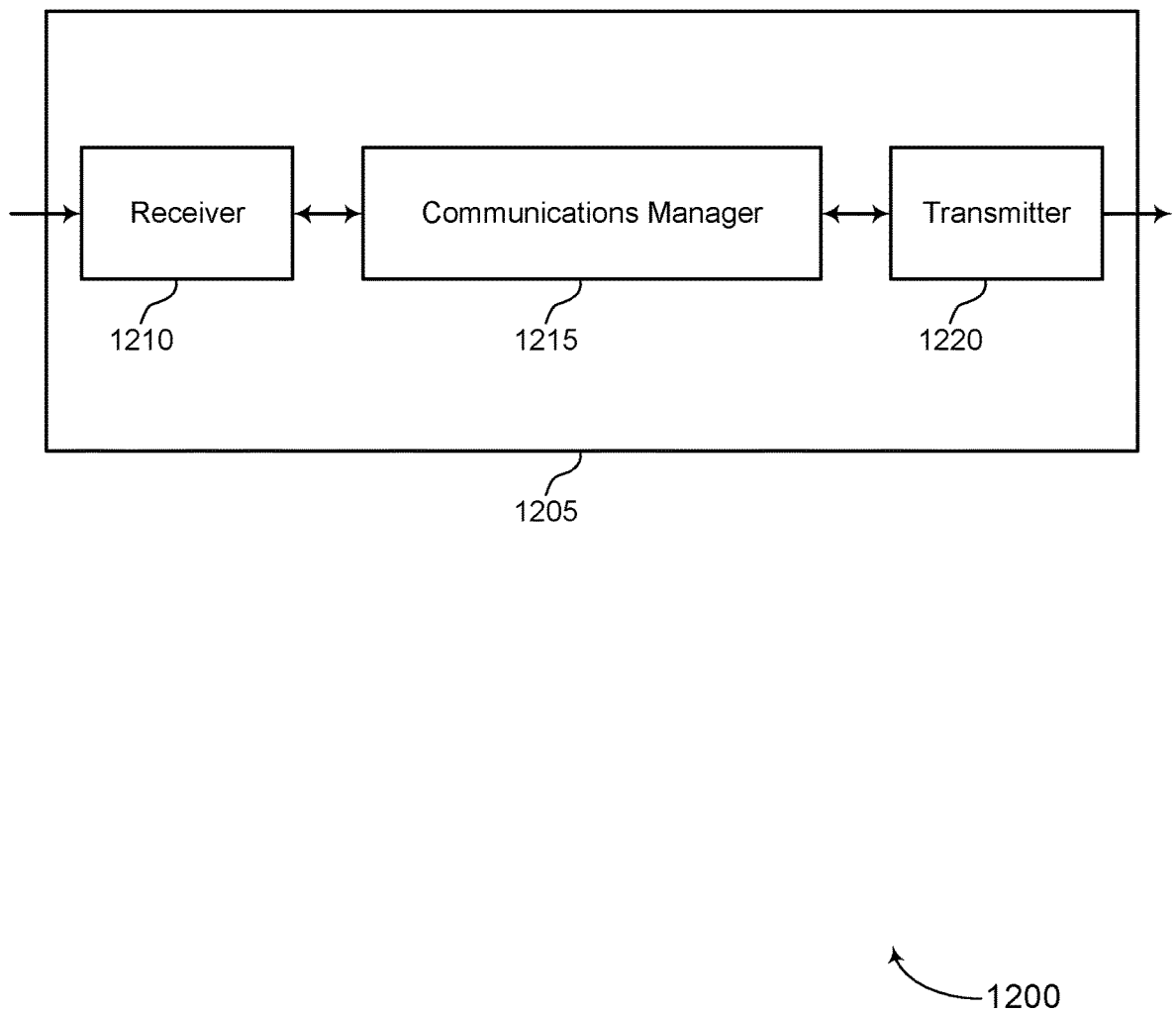
FIGS. 12 and 13 show block diagrams of devices that support techniques for reducing feedback information in accordance with aspects of the present disclosure.

FIG. 12 shows a block diagram 1200 of a device 1205 that supports techniques for reducing feedback information in accordance with aspects of the present disclosure. The device 1205 may be an example of aspects of a STA as described herein. The device 1205 may include a receiver 1210, a communications manager 1215, and a transmitter 1220. The communications manager 1215 can be implemented, as least in part, by one or both of a modem and a processor. Each of these components may be in communication with one another (for example, via one or more buses).

Receiver 1210 may receive information such as packets, user data, or control information associated with various information channels (for example, control channels, data channels, and information related to techniques for reducing feedback information). Information may be passed on to other components of the device. The receiver 1210 may be an example of aspects of the transceiver 1520 described with reference to FIG. 15. The receiver 1210 may utilize a single antenna or a set of antennas.

The communications manager 1215 may receive, from an AP, a sounding signal including one or more spatial streams transmitted over an operating bandwidth, determine a first set of channel characteristics of the operating bandwidth based on receiving the sounding signal, determine a second set of channel characteristics of the operating bandwidth by reducing the first set of channel characteristics based on a feedback reduction parameter, and transmit, to the AP, the second set of channel characteristics. In some implementations, a numerical quantity of the first set of channel characteristics may be reduced when determining the second set of channel characteristics. The communications manager 1215 may be an example of aspects of the communications manager 1510 described herein.

Transmitter 1220 may transmit signals generated by other components of the device. In some examples, the transmitter 1220 may be collocated with a receiver 1210 in a transceiver component. For example, the transmitter 1220 may be an example of aspects of the transceiver 1520 described with reference to FIG. 15. The transmitter 1220 may utilize a single antenna or a set of antennas.

Figure 13:
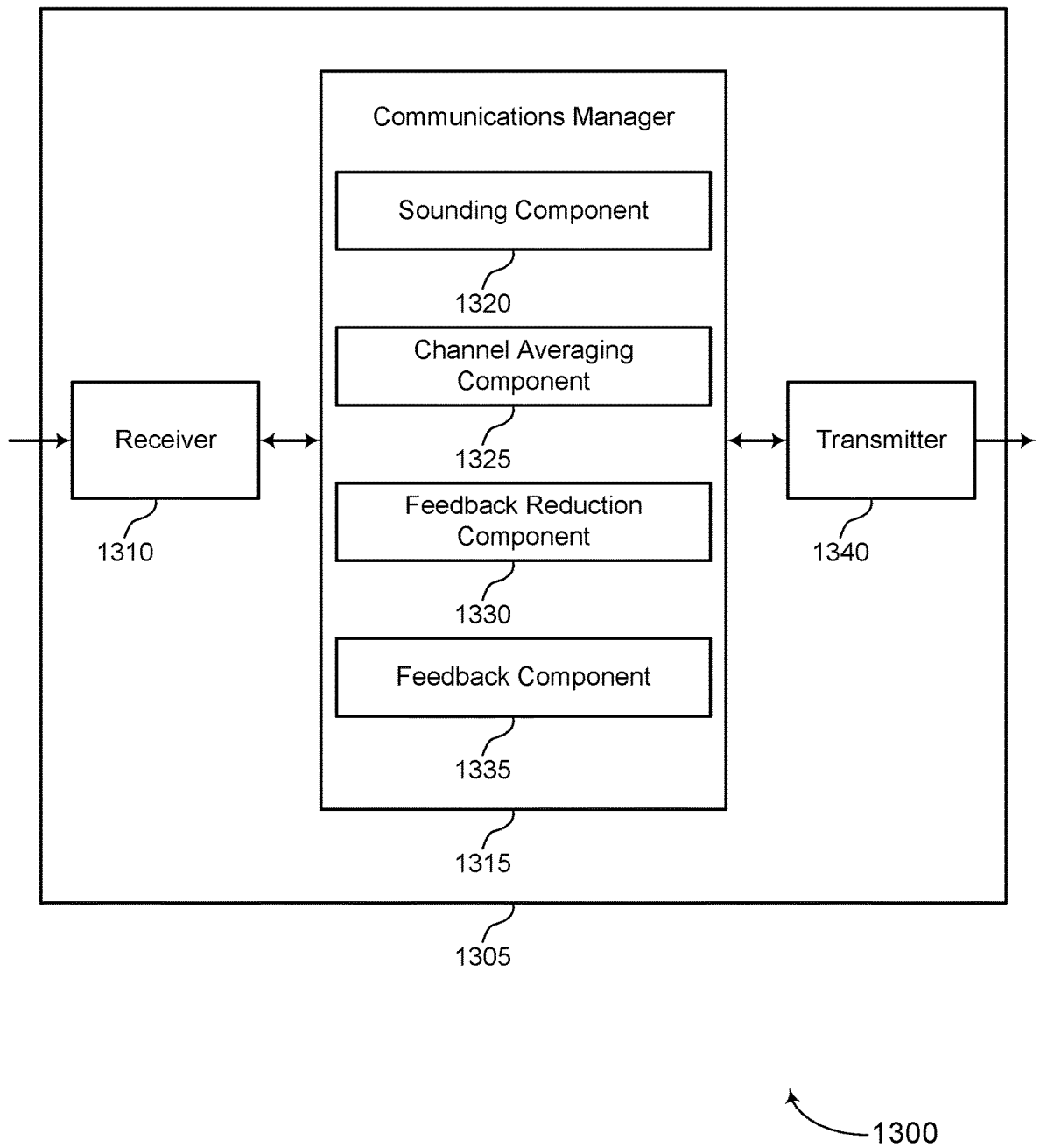

FIG. 13 shows a block diagram 1300 of a device 1305 that supports techniques for reducing feedback information in accordance with aspects of the present disclosure. The device 1305 may be an example of aspects of a device 1205 or a STA 115 as described herein. The device 1305 may include a receiver 1310, a communications manager 1315, and a transmitter 1340. The communications manager 1315 can be implemented, at least in part, by one or both of a modem and a processor. Each of these components may be in communication with one another (for example, via one or more buses).

Receiver 1310 may receive information such as packets, user data, or control information associated with various information channels (for example, control channels, data channels, and information related to techniques for reducing feedback information). Information may be passed on to other components of the device. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a sounding component 1320, a channel averaging component 1325, a feedback reduction component 1330, and a feedback component 1335. The communications manager 1315 may be an example of aspects of the communications manager 1510 described herein.

The sounding component 1320 may receive, from an AP, a sounding signal including one or more spatial streams transmitted over an operating bandwidth.

The channel averaging component 1325 may determine a first set of channel characteristics of the operating bandwidth based on receiving the sounding signal.

The feedback reduction component 1330 may determine a second set of channel characteristics of the operating bandwidth by reducing the first set of channel characteristics based on a feedback reduction parameter.

The feedback component 1335 may transmit, to the AP, the second set of channel characteristics.

Transmitter 1340 may transmit signals generated by other components of the device. In some examples, the transmitter 1340 may be collocated with a receiver 1310 in a transceiver component. For example, the transmitter 1340 may be an example of aspects of the transceiver 1520 described with reference to FIG. 15. The transmitter 1340 may utilize a single antenna or a set of antennas.

Figure 14:
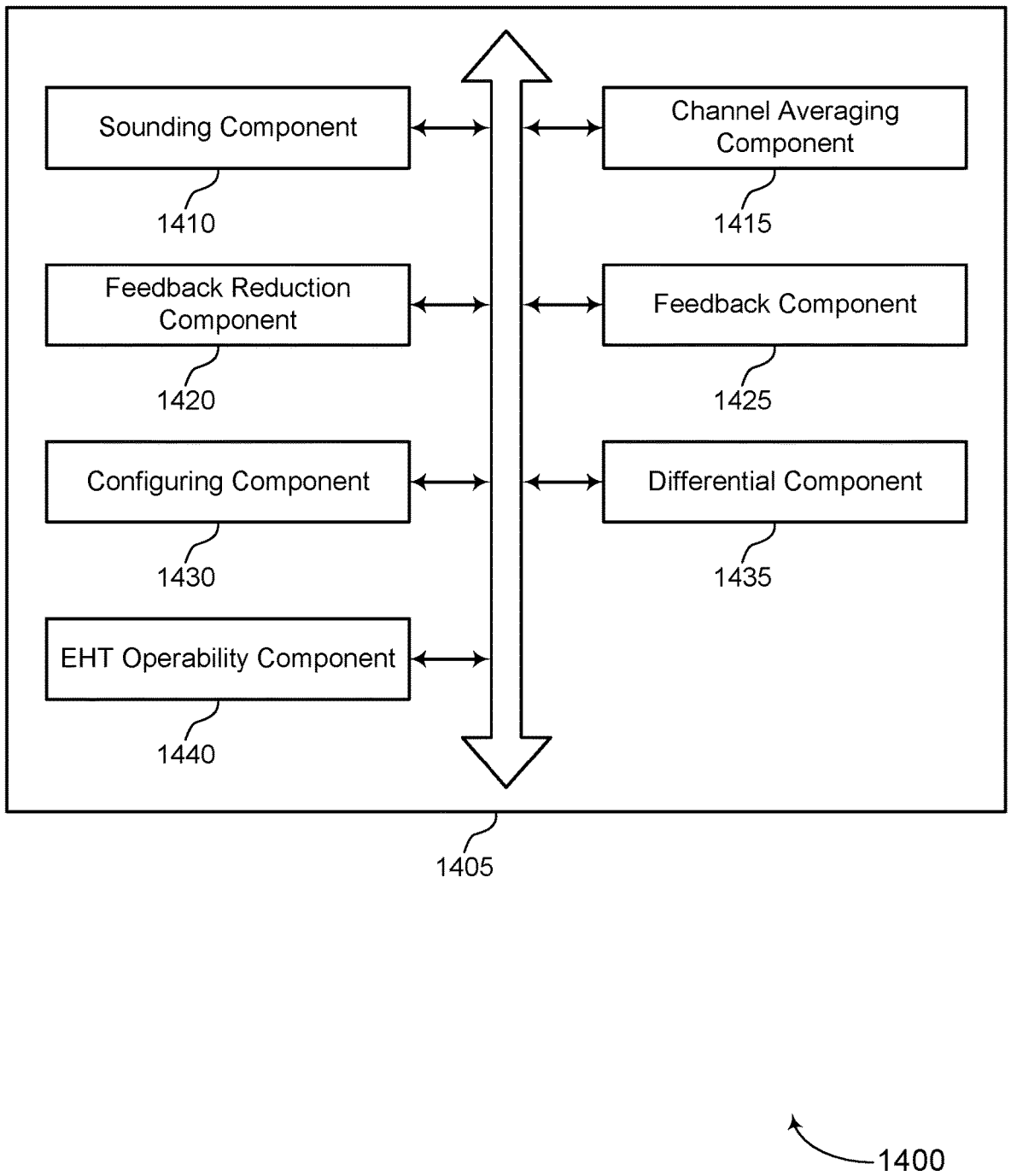
FIG. 14 shows a block diagram of a communications manager that supports techniques for reducing feedback information in accordance with aspects of the present disclosure.

FIG. 14 shows a block diagram 1400 of a communications manager 1405 that supports techniques for reducing feedback information in accordance with aspects of the present disclosure. The communications manager 1405 may be an example of aspects of a communications manager 1215, a communications manager 1315, or a communications manager 1510 described herein. The communications manager 1405 may include a sounding component 1410, a channel averaging component 1415, a feedback reduction component 1420, a feedback component 1425, a configuring component 1430, a differential component 1435, and an EHT operability component 1440. Each of these components may communicate, directly or indirectly, with one another (for example, via one or more buses).

The sounding component 1410 may receive, from an AP, a sounding signal including one or more spatial streams transmitted over an operating bandwidth. In some examples, the second set of channel characteristics are determined as part of a single user channel sounding procedure or as part of a multi-user channel sounding procedure.

The channel averaging component 1415 may determine a first set of channel characteristics of the operating bandwidth based on receiving the sounding signal. In some examples, the channel averaging component 1415 may determine an average channel over an extended bandwidth that exceeds the averaging bandwidth. In some examples, the determining is associated with the set of differential characteristics. In some examples, the averaging bandwidth includes a reduced portion of the operating bandwidth.

The feedback reduction component 1420 may determine a second set of channel characteristics of the operating bandwidth by reducing the first set of channel characteristics based on a feedback reduction parameter. In some examples, selecting a subset of the first set of channel characteristics based on the feedback reduction parameter. In some examples, the second set of channel characteristics includes the subset.

The feedback component 1425 may transmit, to the AP, the second set of channel characteristics. In some examples, the feedback component 1425 may transmit a MIMO control field formatted to include one or more indications of the feedback reduction parameter associated with the second set of channel characteristics.

In some examples, the feedback component 1425 may determine a numerical quantity of feedback bits associated with the set of differential characteristics. In some examples, the number of feedback bits is based on one or more of: a numerical quantity of generated angles for the set of differential characteristics, selected codebook information, an averaging bandwidth for sending the set of differential characteristics, a numerical quantity of bits for signal-to-noise ratio feedback, and a numerical quantity of bits for relative signal-to-noise ratio feedback based on the averaging bandwidth. In some examples, the feedback component 1425 may configure a compressed beamforming report field to include the subset and the set of differential characteristics. In some examples, transmitting the second set of channel characteristics includes transmitting an action frame containing the subset and the set of differential characteristics as feedback in the compressed beamforming report field.

In some examples, the feedback component 1425 may determine a numerical quantity of feedback bits associated with the second set of channel characteristics. In some examples, the number of feedback bits is based on one or more of: a numerical quantity of generated angles for the second set of channel characteristics, selected codebook information, an averaging bandwidth for sending the second set of channel characteristics, a numerical quantity of bits for signal-to-noise ratio feedback, and a numerical quantity of bits for relative signal-to-noise ratio feedback based on the averaging bandwidth. In some examples, the feedback component 1425 may transmit a capability bit to indicate support at the STA for reduced compressed beamforming feedback. In some examples, receiving the sounding signal is based on transmitting the capability bit. In some examples, the second set of channel characteristics includes reduced compressed beamforming feedback information.

The configuring component 1430 may configure the MIMO control field to include at least one bit for indicating that a reduced compressed beamforming feedback operation is associated with the second set of channel characteristics, the at least one bit including one or more reserved bits of the MIMO control field.

In some examples, the configuring component 1430 may configure one or more index subfields of the MIMO control field to indicate a reduction value associated with the second set of channel characteristics, or an averaging bandwidth associated with the second set of channel characteristics, or both. In some examples, the feedback reduction parameter may include the reduction value, the averaging bandwidth, or both. In some examples, the configuring component 1430 may extend one or more subfields of the MIMO control field for a reduced compressed beamforming feedback operation, the one or more subfields indicating a capability for reduced compressed beamforming feedback operation over the operating bandwidth. In some examples, the feedback reduction parameter may include information indicating the capability for support for a reduced compressed beamforming feedback operation over the operating bandwidth.

The differential component 1435 may determine a set of differential characteristics based on the subset.

The EHT operability component 1440 may configure one or more communication features for EHT functionality on the operating bandwidth. In some examples, the operating bandwidth includes a first bandwidth of at least 320 MHz or a second bandwidth including a first 160 MHz portion and a second non-adjacent 160 MHz portion. In some examples, the EHT operability includes multi-antenna operations over a set of spatial streams.

Figure 15:
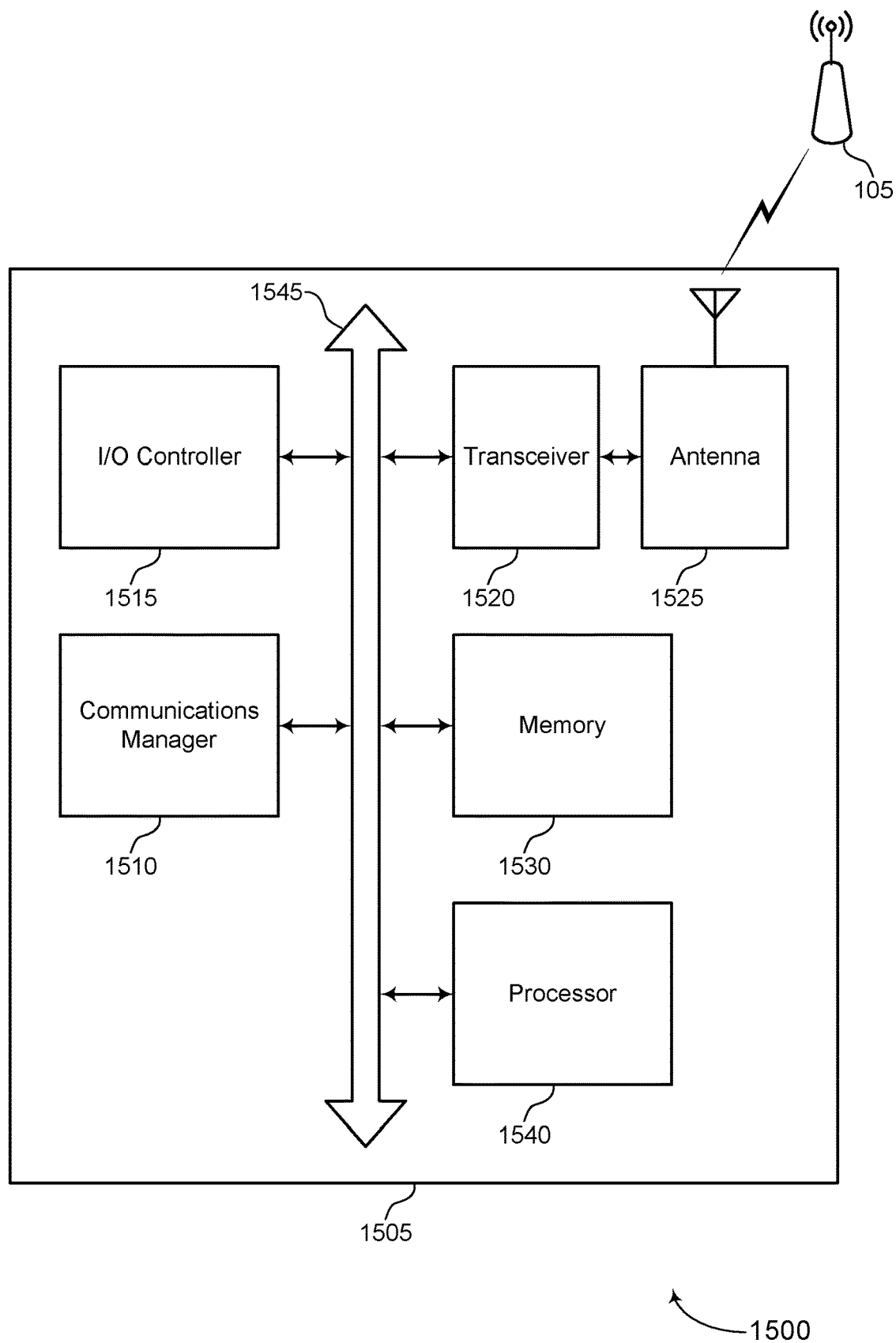
FIG. 15 shows a diagram of a system including a device that supports techniques for reducing feedback information in accordance with aspects of the present disclosure.

FIG. 15 shows a diagram of a system 1500 including a device 1505 that supports techniques for reducing feedback information in accordance with aspects of the present disclosure. The device 1505 may be an example of or include the components of device 1205, device 1305, or a STA as described herein. The device 1505 may include components for bi-directional voice and data communications including components for transmitting and receiving communications, including a communications manager 1510, an I/O controller 1515, a transceiver 1520, an antenna 1525, memory 1530, and a processor 1540. These components may be in electronic communication via one or more buses (for example, bus 1545).

The communications manager 1510 may receive, from an AP, a sounding signal including one or more spatial streams transmitted over an operating bandwidth, determine a first set of channel characteristics of the operating bandwidth based on receiving the sounding signal, determine a second set of channel characteristics of the operating bandwidth by reducing the first set of channel characteristics based on a feedback reduction parameter, and transmit, to the AP, the second set of channel characteristics.

I/O controller 1515 may manage input and output signals for device 1505. I/O controller 1515 may also manage peripherals not integrated into device 1505. In some examples, I/O controller 1515 may represent a physical connection or port to an external peripheral. In some examples, I/O controller 1515 may utilize an operating system such as iOS®, ANDROID®, MS-DOS®, MS-WINDOWS®, OS/2®, UNIX®, LINUX®, or another known operating system. In other cases, I/O controller 1515 may represent or interact with a modem, a keyboard, a mouse, a touchscreen, or a similar device. In some examples, I/O controller 1515 may be implemented as part of a processor. In some examples, a user may interact with device 1505 via I/O controller 1515 or via hardware components controlled by I/O controller 1515.

Transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some examples, the wireless device may include a single antenna 1525. However, in some examples, the device may have more than one antenna 1525, which may be capable of concurrently transmitting or receiving multiple wireless transmissions.

Memory 1530 may include RAM and ROM. The memory 1530 may store computer-readable, computer-executable software 1535 including instructions that, when executed, cause the processor to perform various functions described herein. In some examples, the memory 1530 may contain, among other things, a BIOS which may control basic hardware or software operation such as the interaction with peripheral components or devices.

Processor 1540 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some examples, processor 1540 may be configured to operate a memory array using a memory controller. In other cases, a memory controller may be integrated into processor 1540. Processor 1540 may be configured to execute computer-readable instructions stored in a memory to perform various functions (for example, functions or tasks supporting techniques for reducing feedback information).

Figure 16:
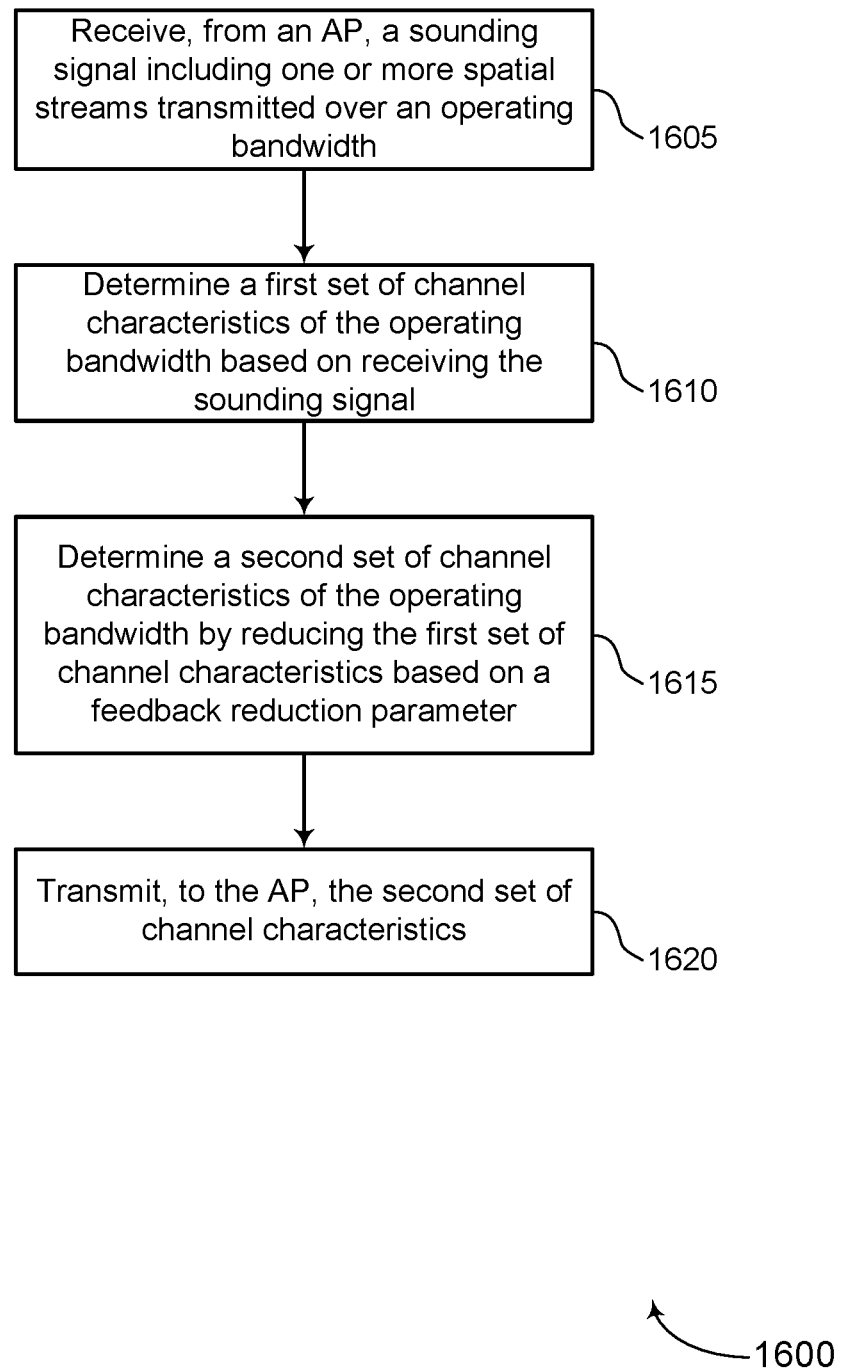
FIGS. 16 through 19 show flowcharts illustrating methods that support techniques for reducing feedback information in accordance with aspects of the present disclosure.

FIG. 16 shows a flowchart illustrating a method 1600 that supports techniques for reducing feedback information in accordance with aspects of the present disclosure. The operations of method 1600 may be implemented by a beamformee, such as a STA, or its components as described herein. For example, the operations of method 1600 may be performed by a communications manager as described with reference to FIGS. 12-15. In some examples, a STA may execute a set of instructions to control the functional elements of the STA to perform the functions described below. Additionally or alternatively, a STA may perform aspects of the functions described below using special-purpose hardware.

At 1605, the STA may receive, from a beamformer (such as, an AP), a sounding signal including one or more spatial streams transmitted over an operating bandwidth. The operations of 1605 may be performed according to the methods described herein. In some examples, aspects of the operations of 1605 may be performed by a sounding component as described with reference to FIGS. 12-15.

At 1610, the STA may determine a first set of channel characteristics of the operating bandwidth based on receiving the sounding signal. The operations of 1610 may be performed according to the methods described herein. In some examples, aspects of the operations of 1610 may be performed by a channel averaging component as described with reference to FIGS. 12-15.

At 1615, the STA may determine a second set of channel characteristics of the operating bandwidth by reducing the first set of channel characteristics based on a feedback reduction parameter. The operations of 1615 may be performed according to the methods described herein. In some examples, aspects of the operations of 1615 may be performed by a feedback reduction component as described with reference to FIGS. 12-15.

At 1620, the STA may transmit, to the AP, the second set of channel characteristics. The operations of 1620 may be performed according to the methods described herein. In some examples, aspects of the operations of 1620 may be performed by a feedback component as described with reference to FIGS. 12-15.

Figure 17:
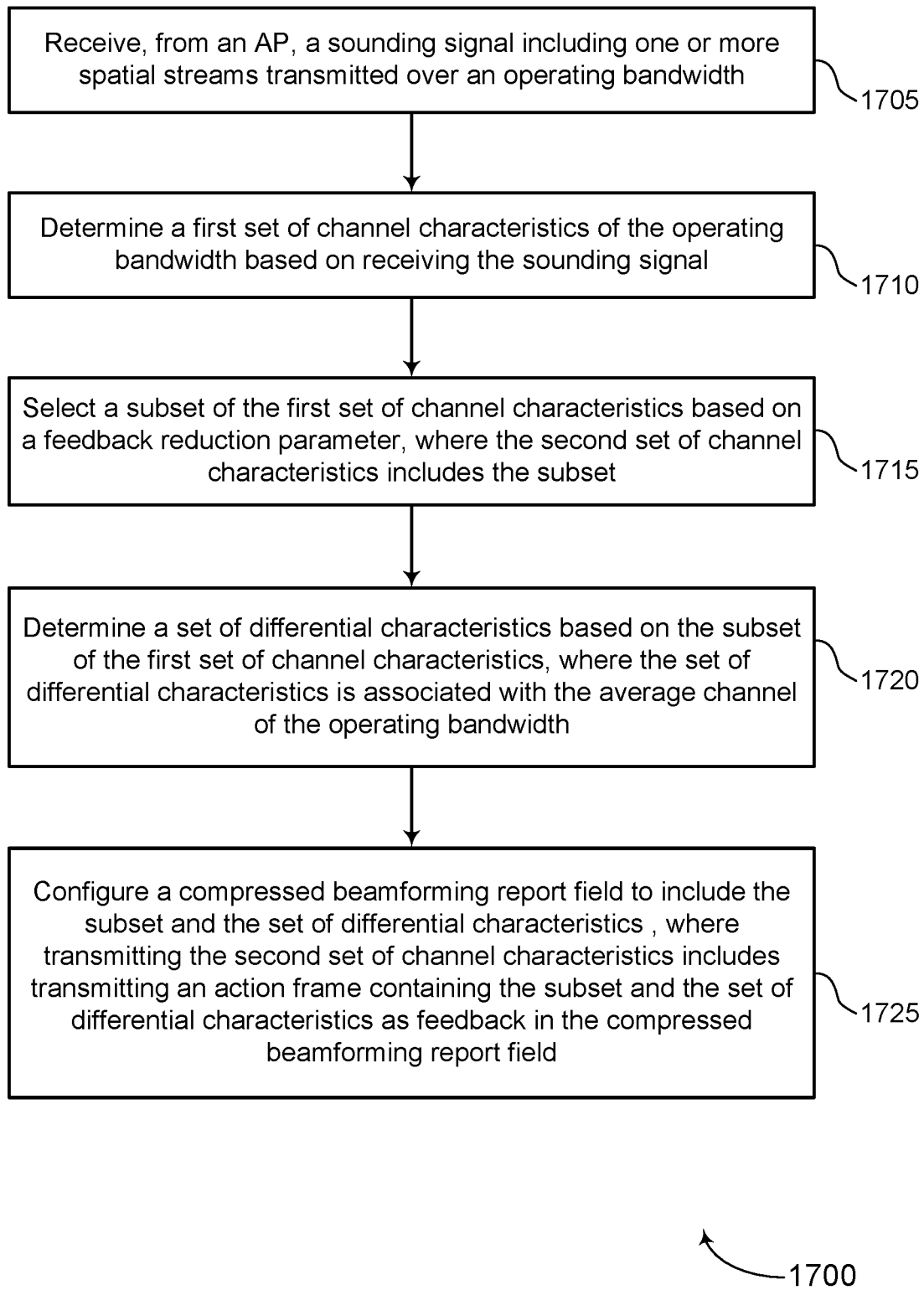

FIG. 17 shows a flowchart illustrating a method 1700 that supports techniques for reducing feedback information in accordance with aspects of the present disclosure. The operations of method 1700 may be implemented by a beamformee, such as a STA, or its components as described herein. For example, the operations of method 1700 may be performed by a communications manager as described with reference to FIGS. 12-15. In some examples, a STA may execute a set of instructions to control the functional elements of the STA to perform the functions described below. Additionally or alternatively, a STA may perform aspects of the functions described below using special-purpose hardware.

At 1705, the STA may receive, from a beamformer (such as, an AP), a sounding signal including one or more spatial streams transmitted over an operating bandwidth. The operations of 1705 may be performed according to the methods described herein. In some examples, aspects of the operations of 1705 may be performed by a sounding component as described with reference to FIGS. 12-15.

At 1710, the STA may determine a first set of channel characteristics of the operating bandwidth based on receiving the sounding signal. The operations of 1710 may be performed according to the methods described herein. In some examples, aspects of the operations of 1710 may be performed by a channel averaging component as described with reference to FIGS. 12-15.

At 1715, the STA may select a subset of the first set of channel characteristics based on the feedback reduction parameter. In some examples, the second set of channel characteristics includes the subset. The operations of 1715 may be performed according to the methods described herein. In some examples, aspects of the operations of 1715 may be performed by a feedback reduction component as described with reference to FIGS. 12-15.

At 1720, the STA may determine a set of differential characteristics based on the subset of the first set of channel characteristics. In some examples, the set of differential characteristics is associated with the average channel of the operating bandwidth. The operations of 1720 may be performed according to the methods described herein. In some examples, aspects of the operations of 1720 may be performed by a differential component as described with reference to FIGS. 12-15.

At 1725, the STA may configure a compressed beamforming report field to include the subset and the set of differential characteristics. In some examples, transmitting the second set of channel characteristics includes transmitting an action frame containing the subset and the set of differential characteristics as feedback in the compressed beamforming report field. The operations of 1725 may be performed according to the methods described herein. In some examples, aspects of the operations of 1730 may be performed by a feedback component as described with reference to FIGS. 12-15.

Figure 18:
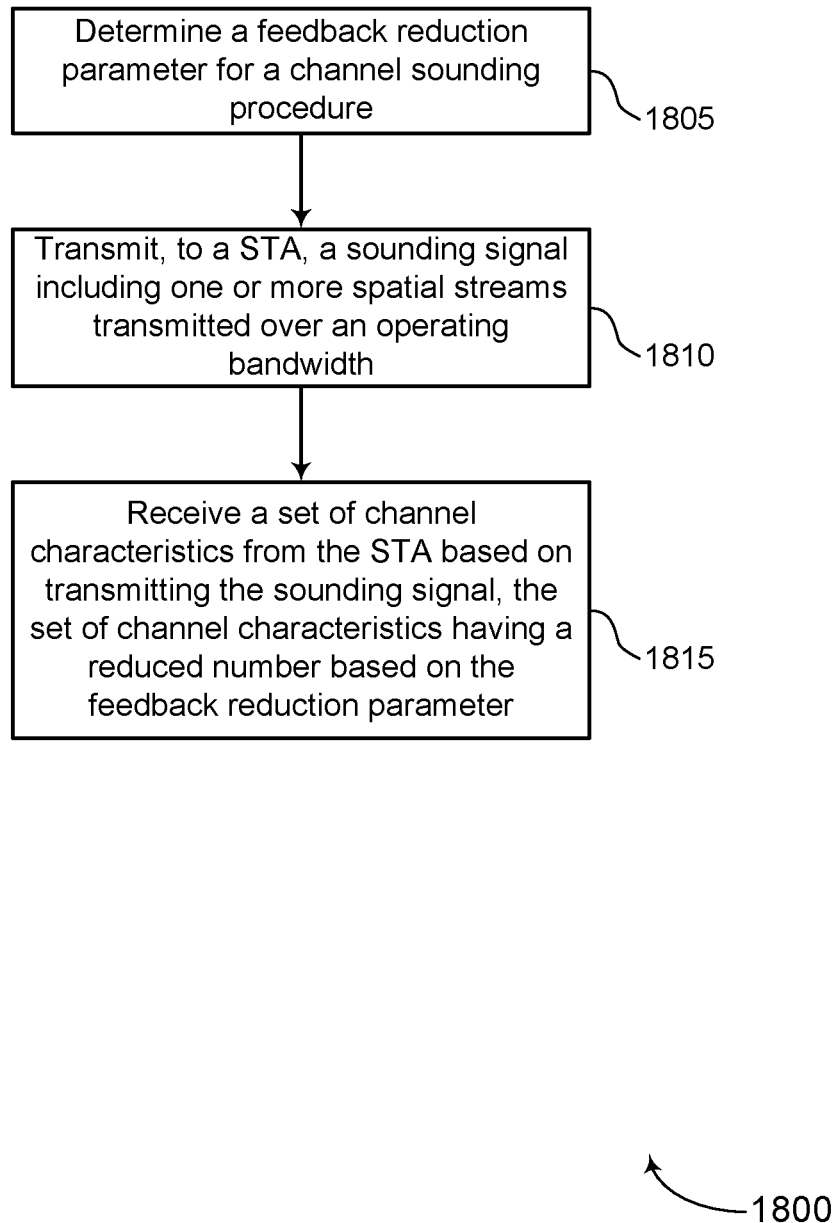

FIG. 18 shows a flowchart illustrating a method 1800 that supports techniques for reducing feedback information in accordance with aspects of the present disclosure. The operations of method 1800 may be implemented by a beamformer, such as an AP, or its components as described herein. For example, the operations of method 1800 may be performed by a communications manager as described with reference to FIGS. 8-11. In some examples, an AP may execute a set of instructions to control the functional elements of the AP to perform the functions described below. Additionally or alternatively, an AP may perform aspects of the functions described below using special-purpose hardware.

At 1805, the AP may determine a feedback reduction parameter for a channel sounding procedure. The operations of 1805 may be performed according to the methods described herein. In some examples, aspects of the operations of 1805 may be performed by a feedback reduction component as described with reference to FIGS. 8-11.

At 1810, the AP may transmit, to a beamformee (such as, a STA), a sounding signal including one or more spatial streams transmitted over an operating bandwidth. The operations of 1810 may be performed according to the methods described herein. In some examples, aspects of the operations of 1810 may be performed by a sounding component as described with reference to FIGS. 8-11.

At 1815, the AP may receive a set of channel characteristics from the STA based on transmitting the sounding signal, the set of channel characteristics having a reduced numerical quantity based on the feedback reduction parameter. The operations of 1815 may be performed according to the methods described herein. In some examples, aspects of the operations of 1815 may be performed by a channel characteristic component as described with reference to FIGS. 8-11.

Figure 19:
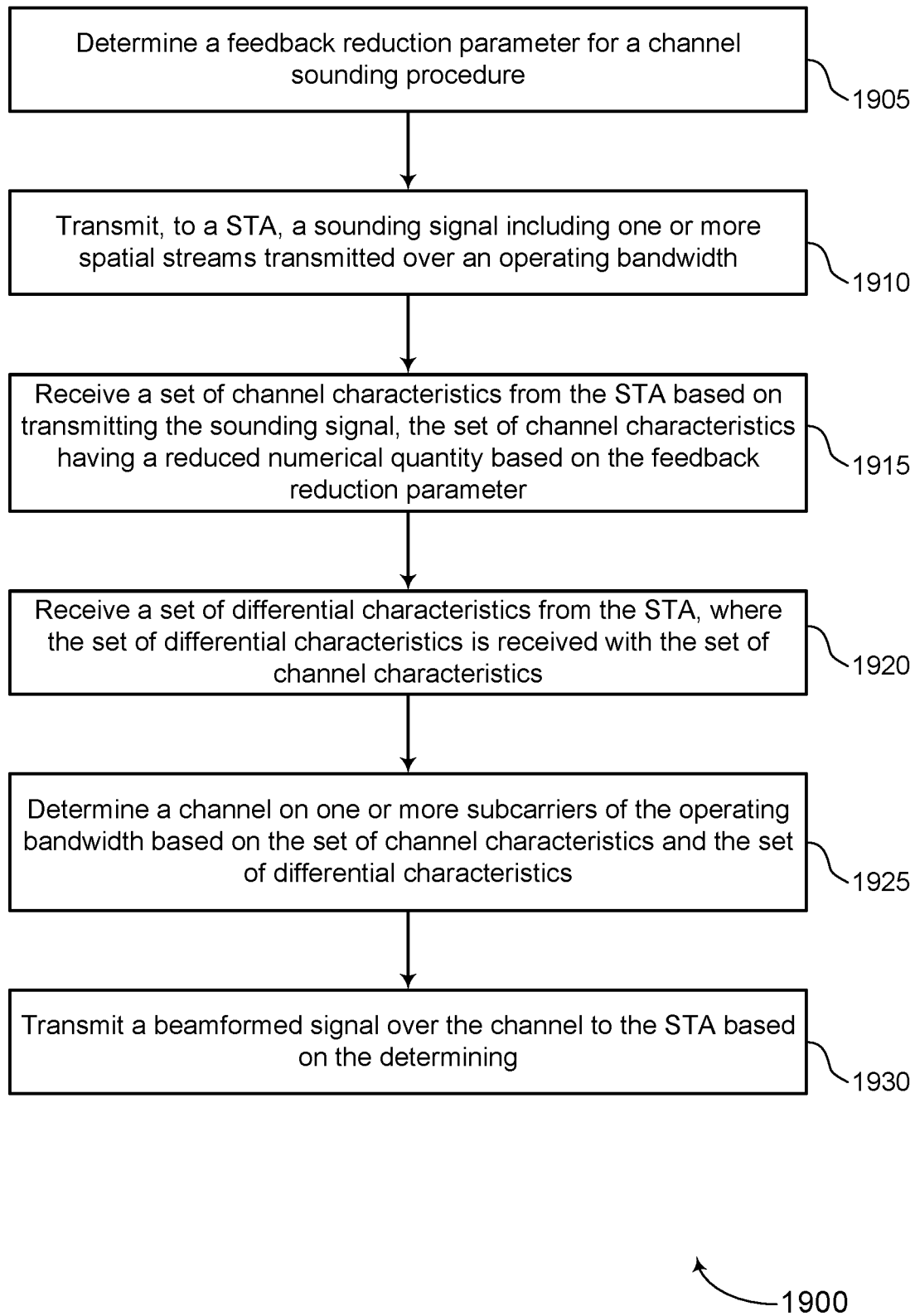

FIG. 19 shows a flowchart illustrating a method 1900 that supports techniques for reducing feedback information in accordance with aspects of the present disclosure. The operations of method 1900 may be implemented by a beamformer, such as an AP, or its components as described herein. For example, the operations of method 1900 may be performed by a communications manager as described with reference to FIGS. 8-11. In some examples, an AP may execute a set of instructions to control the functional elements of the AP to perform the functions described below. Additionally or alternatively, an AP may perform aspects of the functions described below using special-purpose hardware.

At 1905, the AP may determine a feedback reduction parameter for a channel sounding procedure. The operations of 1905 may be performed according to the methods described herein. In some examples, aspects of the operations of 1905 may be performed by a feedback reduction component as described with reference to FIGS. 8-11.

At 1910, the AP may transmit, to a beamformee (such as, a STA), a sounding signal including one or more spatial streams transmitted over an operating bandwidth. The operations of 1910 may be performed according to the methods described herein. In some examples, aspects of the operations of 1910 may be performed by a sounding component as described with reference to FIGS. 8-11.

At 1915, the AP may receive a set of channel characteristics from the STA based on transmitting the sounding signal, the set of channel characteristics having a reduced numerical quantity based on the feedback reduction parameter. The operations of 1915 may be performed according to the methods described herein. In some examples, aspects of the operations of 1915 may be performed by a channel characteristic component as described with reference to FIGS. 8-11.

At 1920, the AP may receive a set of differential characteristics from the STA, the set of differential characteristics is received with the set of channel characteristics. The operations of 1920 may be performed according to the methods described herein. In some examples, aspects of the operations of 1920 may be performed by a channel characteristic component as described with reference to FIGS. 8-11.

At 1925, the AP may determine a channel on one or more subcarriers of the operating bandwidth based on the set of channel characteristics and the set of differential characteristics. The operations of 1925 may be performed according to the methods described herein. In some examples, aspects of the operations of 1925 may be performed by a channel estimation component as described with reference to FIGS. 8-11.

At 1930, the AP may transmit a beamformed signal over the channel to the STA based on the determining. The operations of 1930 may be performed according to the methods described herein. In some examples, aspects of the operations of 1930 may be performed by a channel estimation component as described with reference to FIGS. 8-11.

The methods described herein describe possible implementations, and that the operations and the blocks may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. The techniques described herein may be used for the systems and radio technologies mentioned herein as well as other systems and radio technologies.

A macro cell generally covers a relatively large geographic area (for example, several kilometers in radius) and may allow unrestricted access by STAs with service subscriptions with the network provider. A small cell may be associated with a lower-powered AP or base station, as compared with a macro cell, and a small cell may operate in the same or different (for example, licensed, unlicensed, etc.) frequency bands as macro cells. Small cells may include pico cells, femto cells, and micro cells according to various examples. A pico cell, for example, may cover a small geographic area and may allow unrestricted access by STAs with service subscriptions with the network provider. A femto cell may also cover a small geographic area (for example, a home) and may provide restricted access by STAs having an association with the femto cell (for example, STAs in a closed subscriber group, STAs for users in the home, among other examples).

The wireless communications systems described herein may support synchronous or asynchronous operation. For synchronous operation, the APs may have similar frame timing, and transmissions from different APs may be approximately aligned in time. For asynchronous operation, the APs may have different frame timing, and transmissions from different APs may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by one or more of voltages, currents, electromagnetic waves, magnetic fields or particles, or optical fields or particles.

The various illustrative components, logic, logical blocks, components, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, components, circuits and processes described above. Whether such functionality is implemented in hardware, firmware or software depends upon the particular application and design constraints imposed on the overall system.

The hardware and data processing apparatus used to implement the various illustrative components, logics, logical blocks, components and circuits described in connection with the aspects disclosed herein may be implemented or performed with a general purpose single- or multi-chip processor, a DSP, an ASIC, a FPGA or other PLD, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein or various blocks or steps of a method, operation, process or algorithm disclosed herein can be implemented as one or more components of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above may also be included within the scope of storage media.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at different locations, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c. Also, as used herein, the phrase "based on" shall not be construed as a reference to a closed set of conditions. For example, a step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable sub combination. As such, although features may be described above as acting in particular combinations, and even initially claimed as such, one or more features from a claimed combination can, in some examples, be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The description herein is provided to enable a person having ordinary skill in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a station (STA), comprising:
   receiving, from an access point (AP), a sounding signal comprising one or more spatial streams transmitted over an operating bandwidth;
   determining a first set of channel characteristics of the operating bandwidth for an average channel of the operating bandwidth based at least in part on receiving the sounding signal, the first set of channel characteristics comprising a first dimensionality and a second dimensionality to;
   reducing a value of the first dimensionality of the first set of channel characteristics for the average channel of the operating bandwidth based at least in part on a feedback reduction parameter corresponding to an averaging bandwidth for calculating the average channel, the averaging bandwidth being based at least in part on a signal strength threshold corresponding to a localized average channel of the average channel calculated for a sub-bandwidth of the operating bandwidth, wherein the sounding signal comprises the feedback reduction parameter, the feedback reduction parameter being determined in a bi-directional joint procedure between the STA and the AP;
   determining a second set of channel characteristics for the averaging bandwidth based at least in part on reducing the first set of channel characteristics; and
   transmitting, to the AP, the second set of channel characteristics, wherein:
determining the first set of channel characteristics comprises:
determining the average channel of the operating bandwidth based at least in part on the averaging bandwidth; and
determining the second set of channel characteristics comprises:
determining a set of differential characteristics between the reduced first set of channel characteristics corresponding to the averaging bandwidth for calculating the average channel and characteristics of a second channel of the operating bandwidth.

2. The method of claim 1, wherein transmitting the second set of channel characteristics and the feedback reduction parameter further comprises transmitting a multiple input multiple output (MIMO) control field formatted to include one or more indications of the feedback reduction parameter associated with the second set of channel characteristics.

3. The method of claim 1, further comprising determining a numerical quantity of feedback bits associated with the set of differential characteristics, wherein the numerical quantity of feedback bits is based at least in part on a numerical quantity of generated angles for the set of differential characteristics.

4. The method of claim 1, further comprising configuring a compressed beamforming report field to include the reduced first set of channel characteristics and the set of differential characteristics, wherein transmitting the second set of channel characteristics comprises transmitting an action frame containing the reduced first set of channel characteristics and the set of differential characteristics as feedback in the compressed beamforming report field.

5. The method of claim 1, further comprising determining the average channel over an extended bandwidth that exceeds the averaging bandwidth.

6. The method of claim 1, wherein the feedback reduction parameter is based at least in part on one or more of: a performance loss, a component of a transmit correlation matrix, the operating bandwidth, or an averaging bandwidth of the operating bandwidth, wherein the averaging bandwidth of the operating bandwidth comprises a reduced portion of the operating bandwidth.

7. The method of claim 1, further comprising determining a numerical quantity of feedback bits associated with the second set of channel characteristics, wherein the numerical quantity of feedback bits is based at least in part a numerical quantity of generated angles for the second set of channel characteristics.

8. The method of claim 1, further comprising transmitting a capability bit to indicate support at the STA for reduced compressed beamforming feedback, wherein receiving the sounding signal is based at least in part on transmitting the capability bit.

9. The method of claim 1, wherein the second set of channel characteristics comprises compressed beamforming feedback information.

10. The method of claim 1, wherein the operating bandwidth comprises a first bandwidth of at least 320 MHz or a second bandwidth comprising a first 160 MHz portion and a second non-adjacent 160 MHz portion.

11. The method of claim 1, wherein the STA supports multi-antenna operations over a plurality of spatial streams.

12. The method of claim 2, further comprising configuring the MIMO control field to include at least one bit for indicating that a reduced compressed beamforming feedback operation is associated with the second set of channel characteristics, the at least one bit including one or more reserved bits of the MIMO control field.

13. The method of claim 2, further comprising configuring one or more index subfields of the MIMO control field to indicate the feedback reduction parameter, or the averaging bandwidth for the second set of channel characteristics, or both, wherein the feedback reduction parameter comprises a reduction value, the averaging bandwidth, or both.

14. The method of claim 2, further comprising extending one or more subfields of the MIMO control field, the one or more subfields indicating a capability for support for a reduced compressed beamforming feedback operation over the operating bandwidth, wherein the feedback reduction parameter comprises information indicating the capability for support for the reduced compressed beamforming feedback operation over the operating bandwidth.

15. The method of claim 7, wherein the second set of channel characteristics are determined as part of a single user sounding procedure or as part of a multi-user sounding procedure.

16. A method for wireless communication at an access point (AP), comprising:
determining a feedback reduction parameter for a channel sounding procedure, wherein the feedback reduction parameter is for reducing a value of a first dimensionality of a set of channel characteristics for an average channel;
transmitting, to a station (STA), a sounding signal comprising one or more spatial streams transmitted over an operating bandwidth, wherein the feedback reduction parameter corresponds to an averaging bandwidth for calculating the average channel, the averaging bandwidth being based at least in part on a signal strength threshold corresponding to a localized average channel of the average channel calculated for a sub-bandwidth of the operating bandwidth, wherein the sounding signal comprises the feedback reduction parameter, the feedback reduction parameter being determined in a bi-directional joint procedure between the STA and the AP; and
receiving the set of channel characteristics and the feedback reduction parameter from the STA based at least in part on transmitting the sounding signal, the set of channel characteristics having a reduced first dimensionality or a reduced second dimensionality, or both according to the feedback reduction parameter,
wherein the feedback reduction parameter is based at least in part on the averaging bandwidth for calculating the average channel.

17. The method of claim 16, further comprising:
receiving a set of differential characteristics from the STA, wherein the set of differential characteristics are received with the set of channel characteristics;
determining a channel on one or more sub carriers of the operating bandwidth based at least in part on the set of channel characteristics and the set of differential characteristics; and
transmitting a beamformed signal over the channel to the STA based at least in part on the determining.

18. The method of claim 16, further comprising:
transmitting a frame including one or more indications of the feedback reduction parameter associated with the set of channel characteristics; and
configuring at least one bit in a field of the frame to indicate a reduced compressed beamforming feedback operation.

19. The method of claim 16, wherein the set of channel characteristics are received as part of a single user sounding procedure or as part of a multi-user sounding procedure.

20. The method of claim 16, wherein the feedback reduction parameter is based at least in part on one or more of: a performance loss, a component of a transmit correlation matrix, or the operating bandwidth.

21. The method of claim 16, further comprising transmitting a capability bit to indicate support at the AP for reduced compressed beamforming feedback, wherein transmitting the sounding signal is based at least in part on transmitting the capability bit.

22. The method of claim 18, further comprising configuring one or more index subfields of the frame to indicate the feedback reduction parameter, or the averaging bandwidth for the set of channel characteristics, or both.

23. An apparatus for wireless communication at a station (STA), comprising:
one or more processors; and
one or more memories in electronic communication with the one or more processors and storing one or more instructions,
the one or more instructions executable by the one or more processors to cause the apparatus to:
receive, from an access point (AP), a sounding signal comprising one or more spatial streams transmitted over an operating bandwidth;
determine a first set of channel characteristics of the operating bandwidth for an average channel of the operating bandwidth based at least in part on receiving the sounding signal, the first set of channel characteristics comprising a first dimensionality and a second dimensionality to;
reduce a value of the first dimensionality of the first set of channel characteristics for the average channel of the operating bandwidth based at least in part on a feedback reduction parameter corresponding to an averaging bandwidth for calculating the average channel, the averaging bandwidth being based at least in part on a signal strength threshold corresponding to a localized average channel of the average channel calculated for a sub-bandwidth of the operating bandwidth, wherein the sounding signal comprises the feedback reduction parameter, the feedback reduction parameter being determined in a bi-directional joint procedure between the STA and the AP;
determine a second set of channel characteristics for the averaging bandwidth based at least in part on reducing the first set of channel characteristics; and
transmit, to the AP, the second set of channel characteristics,
wherein:
determining the first set of channel characteristics comprises:
determining the average channel of the operating bandwidth based at least in part on the averaging bandwidth; and
determining the second set of channel characteristics comprises:
determining a set of differential characteristics between the reduced first set of channel characteristics corresponding to the averaging bandwidth for calculating the average channel and characteristics of a second channel of the operating bandwidth.

24. The apparatus of claim 23, wherein the one or more instructions to transmit the second set of channel characteristics and the feedback reduction parameter further are executable by the one or more processors to cause the apparatus to transmit a multiple input multiple output (MIMO) control field formatted to include one or more indications of the feedback reduction parameter associated with the second set of channel characteristics.

25. The apparatus of claim 24, wherein the one or more instructions are further executable by the one or more processors to cause the apparatus to configure the MIMO control field to include at least one bit for indicating that a reduced compressed beamforming feedback operation is associated with the second set of channel characteristics, the at least one bit including one or more reserved bits of the MIMO control field.

26. The apparatus of claim 24, wherein the one or more instructions are further executable by the one or more processors to cause the apparatus to configure one or more index subfields of the MIMO control field to indicate the feedback reduction parameter, or the averaging bandwidth for the second set of channel characteristics, or both, wherein the feedback reduction parameter comprises a reduction value, the averaging bandwidth, or both.

27. The apparatus of claim 24, wherein the one or more instructions are further executable by the one or more processors to cause the apparatus to extend one or more subfields of the MIMO control field, the one or more subfields indicating a capability for support for a reduced compressed beamforming feedback operation over the operating bandwidth, wherein the feedback reduction parameter comprises information indicating the capability for support for the reduced compressed beamforming feedback operation over the operating bandwidth.

28. An apparatus for wireless communication at an access point (AP), comprising:
one or more processors; and
one or more memories in electronic communication with the one or more processors and storing one or more instructions,
the one or more instructions executable by the one or more processors to cause the apparatus to:
determine a feedback reduction parameter for a channel sounding procedure, wherein the feedback reduction parameter is for reducing a value of a first dimensionality of a set of channel characteristics for an average channel;
transmit, to a station (STA), a sounding signal comprising one or more spatial streams transmitted over an operating bandwidth, wherein the feedback reduction parameter corresponds to an averaging bandwidth for calculating the average channel; and
receive the set of channel characteristics and the feedback reduction parameter from the STA based at least in part on transmitting the sounding signal, the set of channel characteristics having a reduced first dimensionality or a reduced second dimensionality, or both according to the feedback reduction parameter, the averaging bandwidth being based at least in part on a signal strength threshold corresponding to a localized average channel of the average channel calculated for a sub-bandwidth of the operating bandwidth, wherein the sounding signal comprises the feedback reduction parameter, the feedback reduction parameter being determined in a bi-directional joint procedure between the STA and the AP,
wherein the feedback reduction parameter is based at least in part on the averaging bandwidth for calculating the average channel.

29. The apparatus of claim 28, wherein the one or more instructions are further executable by the one or more processors to cause the apparatus to:
- receive a set of differential characteristics from the STA, wherein the set of differential characteristics are received with the set of channel characteristics;
- determine a channel on one or more sub carriers of the operating bandwidth based at least in part on the set of channel characteristics and the set of differential characteristics; and
- transmit a beamformed signal over the channel to the STA based at least in part on the determining.

* * * * *